(12) United States Patent
Narurkar et al.

(10) Patent No.: US 6,339,795 B1
(45) Date of Patent: Jan. 15, 2002

(54) AUTOMATIC TRANSFER OF ADDRESS/SCHEDULE/PROGRAM DATA BETWEEN DISPARATE DATA HOSTS

(75) Inventors: Rajen Narurkar, Santa Clara; Chandra Bodapati, Saratoga, both of CA (US)

(73) Assignee: eGrabber, Inc., Saratoga, CA (US)

( * ) Notice: Subject to any disclaimer, the term of this patent is extended or adjusted under 35 U.S.C. 154(b) by 0 days.

(21) Appl. No.: 09/229,593

(22) Filed: Jan. 13, 1999

Related U.S. Application Data

(60) Provisional application No. 60/101,750, filed on Sep. 24, 1998.

(51) Int. Cl.[7] .............................................. G06F 13/00
(52) U.S. Cl. ...................................... 709/246; 709/230
(58) Field of Search ................................ 709/246, 232, 709/230

(56) References Cited

U.S. PATENT DOCUMENTS

| | | | | |
|---|---|---|---|---|
| 5,392,390 A | * | 2/1995 | Crozier | 345/335 |
| 5,638,517 A | * | 6/1997 | Bartek et al. | 709/246 |
| 5,666,553 A | * | 9/1997 | Crozier | 707/540 |
| 5,701,423 A | * | 12/1997 | Crozier | 345/335 |
| 5,864,668 A | * | 1/1999 | Andert et al. | 709/203 |
| 6,041,344 A | * | 3/2000 | Bodamer et al. | 709/203 |

* cited by examiner

*Primary Examiner*—Kenneth R. Coulter
(74) *Attorney, Agent, or Firm*—Oppenheimer, Wolff & Donnelly, LLP; Claude A. S. Hamrick

(57) ABSTRACT

A data exchange process for transferring data representing a geographical address from a source host using a source data format to a destination host using a destination data format including the steps of: using a first driver to extract a data block from the source host and to convert the format of the data block from the source data format to an intermediate data format; and temporarily storing the data block in an intermediate memory storage location; determining if the data block includes plain text data which is not parsed and identified by corresponding tags. If the data block includes plain text data which is not parsed and identified by corresponding tags, the process provides for automatically parsing the data block into a plurality of data portions having corresponding tags associated therewith, each of the tags indicating a type of information represented by the corresponding data portion. A second driver is used to convert the format of the data block from the intermediate data format to the destination data format, and to insert the data block into the destination host. The step of automatically parsing the data block into a plurality of data portions includes the steps of: identifying a plurality of text strings of the plain text data; and comparing the text strings to a plurality of predefined patterns to determine pattern matches between the text strings and the predefined patterns.

20 Claims, 21 Drawing Sheets

AUTOMATIC TRANSFER OF ADDRESS/ SCHEDULE/PROGRAM DATA BETWEEN DISPARATE DATA HOSTS

This application claims the benefit of U.S. Provisional Application No. 60/101,750, filed Sep. 24, 1998, entitled "Address Grabber Software".

BACKGROUND OF THE INVENTION

A computer program listing appendix entitled "Appendix to Ser. No. 09/229,593" and contained on a compact disc submitted herewith, is incorporated herein by reference in its entirety. Applicant submits two compact discs, one original plus an identical copy, containing one file with the title "Appendix to Ser. No. 09/229,593".

1. Field of the Invention

The present invention relates generally to methods for exchanging data between disparate data hosts including application programs and data bases. More specifically, the present invention relates to a user transparent process for exchanging and routing data representing postal address information between disparate data hosts.

2. Description of the Prior Art

Application programs and databases, including relational databases, are examples of data hosts used for generating, manipulating, and storing data. A wide variety of data hosts are commercially available for managing many different types of data for a multitude of purposes. Application programs and databases typically include strict rules for defining composite data types that may be used therein. The data types may include records, arrays and other structures.

Generally, data formats may be categorized as either plain text data, or parsed and tagged data. Plain text data is of variable length and composition and is not easily parsed into fields, and therefore there are no portions of the plain text data which are separately identifiable. Plain text data is most commonly managed in word processing type application programs. In database files, data is generally managed in a parsed and tagged type of format either by a database manager or by a special purpose application program.

Database files generally include data records and header records. In general, database files may be managed either by a database manager or by a special-purpose application program. A database manager provides for a user to specify record structures upon creation of the database file. A record structure is generally described by field names, data formats, and byte offsets or specific delimiters in the record. Database manager programs maintain data dictionary records as headers in the database file, the records typically specifying parameters associated with each field including a name, a start byte offset, and a data format. Special-purpose application programs are used to generate and manipulate databases of one specified record structure, the specification of which is embedded in the code of the program rather than in header records of the file. Currently, there is no standard internal data format used by all application programs and data base managers. Application programs and data bases typically use complex proprietary data formats.

The disparity in internal data formats between different types of application programs and database managers causes problems for users who wish to exchange data between these disparate databases. A disparity in internal data formats from one data host to another may also arise due to the use of different compilers and different hardware architectures, sometimes referred to as "platforms". application programs and data bases are written in a higher order language, and then compiled by other programs called compilers. The same or different compilers used on different computers may result in different internal data formats for the same data. Different compilers used on identical platforms may also result in different internal data formats. Another problem is that different compilers and platforms may use different byte ordering including Big-Endian and Little-Endian byte ordering.

It has become increasingly desirable for users to be able to conveniently exchange data between disparate application programs and databases running on disparate computer platforms including desk top computers, hand held computers, and web servers. Due to the disparities in the internal data formats of the various data hosts, transfer of data between disparate data hosts typically is not readily achievable via ordinary file transfer. The different internal data formats must be reconciled for disparate data hosts to communicate with each other. When information is to be exchanged between disparate data hosts, some form of data format conversion is required.

A variety of prior art techniques have been developed specifically for exchanging data between handheld computers and desk top computers. Handheld computers, such as personal digital assistants (PDA's), typically provide some combination of personal information management functions, database functions, word processing functions, and spreadsheet functions. Due to limitations in memory size and processing power, handheld computers are generally limited in functionality and differ in data content and usage from similar applications on desktop computers. Many users of handheld computers, such as personal digital assistants (PDA's), also own a desktop computer which may be used for application programs that manage data similar to the data stored in the handheld computer. A user typically stores the same data on the desktop computer and handheld computer. Therefore, it is very desirable for a user to be able to conveniently exchange data between desk top application programs and data bases, and memory resident data sets of a hand held computer.

Data exchange between disparate application programs is also very important in electronic commerce wherein computer systems are interconnected through computer networks of various configurations. Networked computer systems have allowed for the emergence of many different types of transactions between users operating disparate application programs running on disparate computer platforms. A recent development in the World Wide Web is the capability to send data from web clients back to a web server using fill-in "forms". This enables web users to enter information such as, for example, credit card numbers and addresses for purchases made over the Internet. In the growing field of electronic commerce, many such information transactions are becoming common place of for varying purposes. A "form" typically includes standard graphic user interface (GUI) controls such as text boxes, check boxes, and menus. Each control is given a name that eventually becomes a variable item that a processing script uses. Text and password boxes can be used to create registration forms which include fields representing an address including a name field, a phone number field, a street address field, a city field, a state field, and a zip code field, a phone number field, an e-mail address field, and a web address field.

In accordance with one type of prior art methods for exchanging data between disparate data hosts, a user must call separate services to encode and decode basic data field types or to define messages in a separate language syntax that will be used for information exchange. These prior approaches do not provide transparent data exchange, and impose a significant translation overhead on the systems involved.

Crozier (U.S. Pat. No. 5,701,423, issued Dec. 23, 1997) discloses a computer implemented method for translating computer data from a source record structure having information arranged in a source file, to a destination record structure. Each of the source and destination record structures includes a plurality of fields, each having a name. The destination record structure differs from the source record structure in field name, field order, or one-to-many or many-to-one field correspondence. The source file exists on a first computer and the destination record structure is specified by a program for execution on a second computer. The method includes the steps of: presenting the names of the fields of each of the source and destination record structures on a display; allowing a user to interactively select a field from the source record structure and a corresponding field from the destination record structure, thereby establishing a mapping between the fields; and translating the information of the source file, which is arranged in the source record structure, into a form compatible with the destination record structure in accordance with the mapping. This method is not transparent to the user because it places a burden of defining a mapping model for data translation on the user of the data hosts.

What is needed is a process for user-transparent exchange of data between disparate data hosts running on disparate computer platforms including hand held computers, desk top computers, and web servers, wherein the process provides automatic mapping between fields of a source data host and corresponding fields of a destination data host.

What is also needed is a process for user-transparent exchange of data between disparate data hosts wherein if the internal data format of the source data host is a plain text data format, the process provides automatic parsing of the plain text data into a plurality of data portions having corresponding tags associated therewith, each of the tags indicating a type of information represented by the corresponding data portion.

Further needed is a process for user-transparent exchange of data between disparate data hosts running on disparate computer platforms, wherein the process facilitates more convenient transactions in electronic commerce.

SUMMARY OF THE INVENTION

It is an object of the present invention to provide a process for user-transparent exchange of data between disparate data hosts running on disparate computer platforms including hand held computers, desk top computers, and web servers, wherein the process provides automatic mapping between fields of a source data host and corresponding fields of a destination data host.

It is also an object of the present invention to provide a process for user-transparent exchange of data representing postal address information between disparate data hosts wherein the process provides automatic mapping between fields of a source data host and corresponding fields of a destination data host.

It is a further object of the present invention to provide a process for exchanging data representing postal address information between disparate data hosts wherein if the internal data format of the source host is a plain text data format, the process provides automatic parsing of the plain text data into a plurality of data portions having corresponding tags associated therewith, each of the tags indicating a type of information represented by the corresponding data portion.

Briefly, a presently preferred embodiment of the present invention includes a data exchange process for transferring data representing a geographical address from a source host using a source data format to a destination host using a destination data format. The process includes the steps of: using a first driver to extract a data block from the source host and to convert the format of the data block from the source data format to an intermediate data format; and temporarily storing the data block in an intermediate memory storage location; determining if the data block includes plain text data which is not parsed and identified by corresponding tags If the data block includes plain text data which is not parsed and identified by corresponding tags, the process provides for automatically parsing the data block into a plurality of data portions having corresponding tags associated therewith, each of the tags indicating a type of information represented by the corresponding data portion. A second driver is used to convert the format of the data block from the intermediate data format to the destination data format, and to insert the data block into the destination host.

The step of automatically parsing the data block into a plurality of data portions includes the steps of: identifying a plurality of text strings of the plain text data; and comparing the text strings to a plurality of predefined patterns to determine pattern matches between the text strings and the predefined patterns. The step of identifying a plurality of text strings of the plain text data includes: assigning a line number to a plurality of text lines of the plain text data; assigning a starting position value and an ending position value to each of the text strings of each the text line of the plain text data.

In the preferred embodiment, the step of automatically parsing the data block into a plurality of parsed data portions further includes the steps of: contextually analyzing the text strings including determining positional relationships between various ones of the pattern matches; and generating a plurality of probability weights for each of the text strings based on the pattern matches and the positional relationships between the various ones of the pattern matches, each of the probability weight factors indicating a probability that the corresponding text string represents a corresponding type of information; and determining the data portions and the corresponding tags based on the pattern matches and the probability weight factors.

The step of identifying the plurality of text strings includes the steps of: reading plain text data of the data block; sorting the plain text data into a plurality of text lines; determining spaces, tabs, and punctuation marks in the plain text data; collapsing multiple spaces on each text line to a single space; and for each tab found, beginning a new text line and deleting the tab.

The probability weight factors include: name probability weights each indicating a probability that a corresponding text string represents a company name; company name probability weights each indicating a probability that a corresponding text string represents a company; address probability weights each indicating a probability that a corresponding text string represents an address; city name probability weights each indicating a probability that a corresponding text string represents a city name; zip code probability weights each indicating a probability that a corresponding text string represents a zip code; and title probability weights each indicating a probability that a corresponding text string represents a title.

An important advantage of the present invention is that a user is not required to specify a mapping between fields of the source data host and fields of the destination data host.

Another advantage of the present invention is that plain text data representing postal address information can be automatically parsed, tagged, and transferred from a source host to data fields of a destination host.

The foregoing and other objects, features, and advantages of the present invention will be apparent from the following detailed description of the preferred embodiment which makes reference to the several figures of the drawing.

IN THE DRAWINGS

DETAILED DESCRIPTION OF THE PREFERRED EMBODIMENTS

Figure 1:
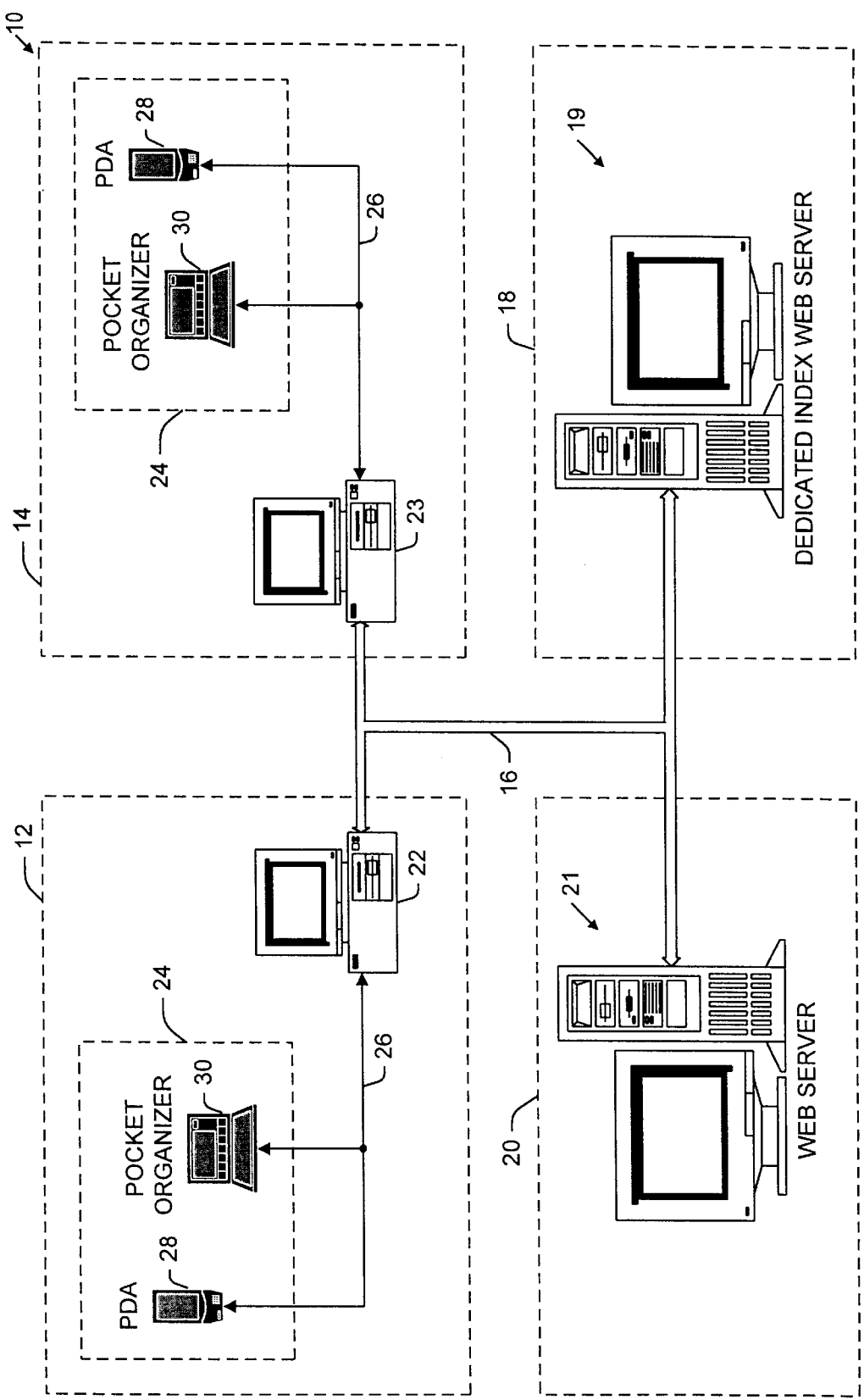
FIG. 1 is a generalized block diagram of a networked system for implementing a process according to the present invention for exchanging data between disparate data hosts running on disparate computer platforms.

FIG. 1 shows a generalized block diagram of a networked system at 10 for implementing a process according to the present invention for automatic transparent exchange of data between disparate data hosts including, application programs and data base managers, having different internal data formats, wherein the disparate data hosts may be running on disparate computer platforms. The system 10 comprises: a plurality of user sites, or client sites, including a first user site 12, and a second user site 14 located remotely from the first user site 12 and coupled for communication with the first user site 12 via a network 16; a dedicated index web-site 18 having a dedicated index web-server 19 according to the present invention coupled for communication with at least one of the user sites via the network 16; and a web-site 20 having a web-server 21 coupled for communication with at least one of the user sites via the network.

The first user site 12 includes: a first client computer system 22; and hand-held computer devices 24 coupled with the computer system 22 via coupling means 26 (e.g., a cable or a bus). The second user site 14 includes: a second client computer system 23 providing a computer platform different from the platform provided by the first client computer system 22 of the first user site 12; and hand-held computer devices 24 coupled with the computer system 23. The hand-held computer devices 24 may include, for example, a personal digital assistant (PDA) 28 (e.g., a Palm-Pilot™ device) and a pocket organizer 30. Each of the hand-held computer devices 24 provides personal information management functions, database functions, word processing functions, and spread sheet functions.

As further explained below, if a particular data host executed by one of the client computer systems 22, 23 has a file format which cannot be identified locally in accordance with of the data exchange process of the present invention using data format characteristic libraries which are resident at the client computer system, the present invention provides for extraction of sampled data from the particular data host, and transmission of the sampled data to the dedicated index web-server 19. The dedicated index web-server 19 analyzes the sampled data received from the client, and provides a driver interface module, which is compatible with the previously unidentified data host, back to the client.

Figure 2:
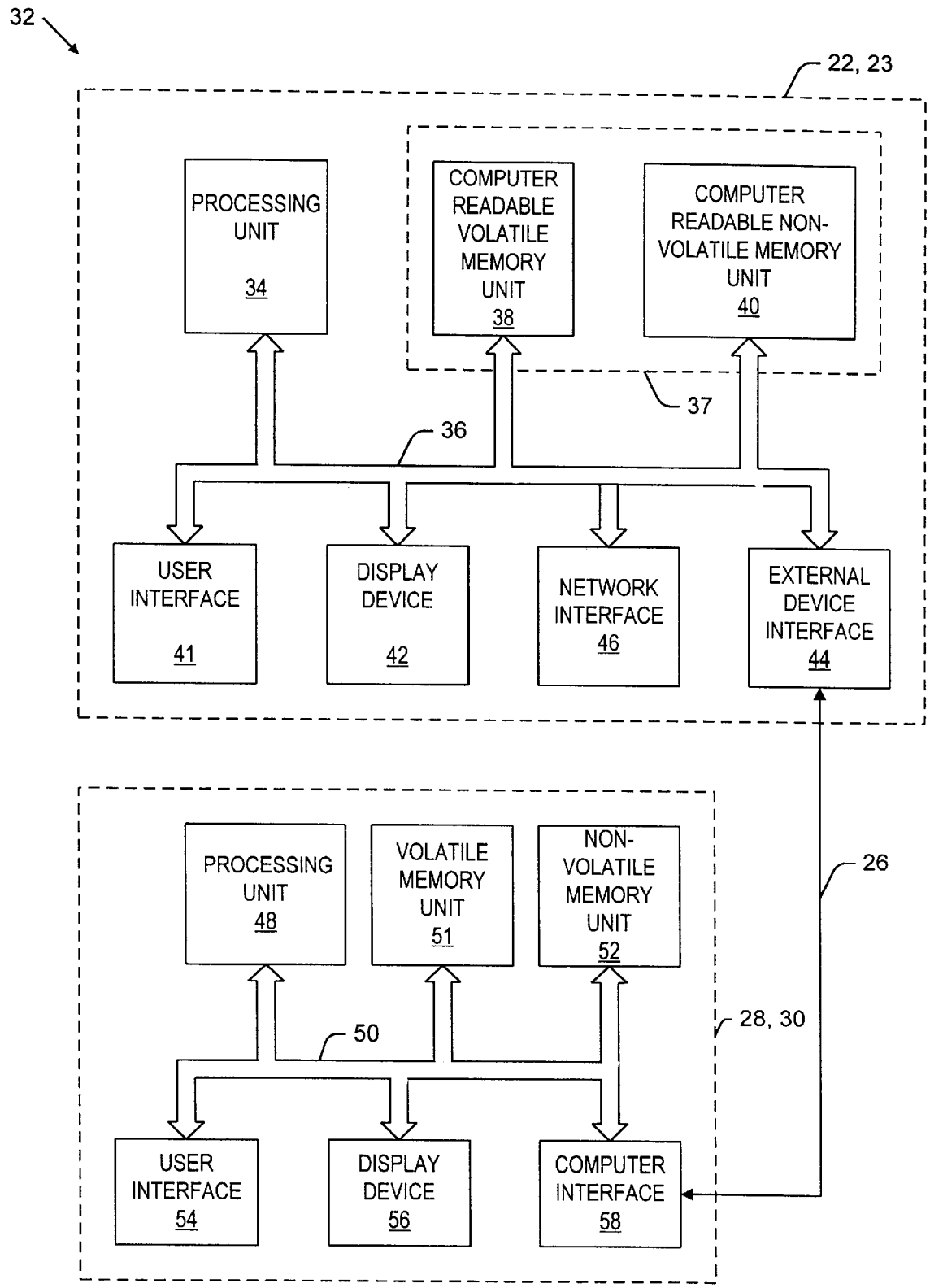
FIG. 2 is a block diagram of an exemplary computer system for executing software modules of the data exchange process, the computer system being connected with a hand held computer.

FIG. 2 shows a detailed block diagram at 32 of basic components of each of the client computer systems 22 and 23 (FIG. 1). Each of the client computer systems 22 and 23 includes: a processing unit 34 coupled to a system bus 36; computer readable memory 37 coupled to the system bus and having a computer readable volatile memory unit 38 (e.g., RAM) serving as the main memory, or working memory of the computer system, and a computer readable non-volatile memory unit 40 (e.g., a hard disk drive) serving as the auxiliary memory, or mass storage, of the computer system; a user interface 41, such as a keyboard and mouse, coupled to the system bus; a display device 42 coupled to the system bus; an external device interface unit 44 coupled to the system bus, and providing an interface between the hand-held computer devices 24 (FIG. 1) and the computer system 22, 23; and a network interface unit 46 coupled to the system bus, and providing an interface between the computer system 22, 23 and the network 16 (FIG. 1). As mentioned above, the second client computer system 23 (FIG. 1) provides a computer platform which may or may not be different from the platform provided by the first client computer system 22 (FIG. 1). As examples, the first and second client computer systems 22 and 23 (FIG. 1) may use different operating systems and/or different specific hardware configurations.

Each of the hand held computer devices 28, 30 includes: a processing means 48 coupled to a system bus 50; a computer readable volatile memory unit 51 (e.g., RAM) coupled to the system bus 50, and serving as the main memory, or working memory of the hand held computer device, and a computer readable non-volatile memory unit 52 coupled to the system bus 50, and serving as the auxiliary memory, or mass storage, of the hand held computer device; a user interface 54, such as a keyboard and mouse, coupled to the system bus; a display device 56 coupled to the system bus; and an interface unit 58 coupled to the system bus, the interface 58 providing a method for exchanging data between the hand held device and the computer system 22, 23.

Figure 3:
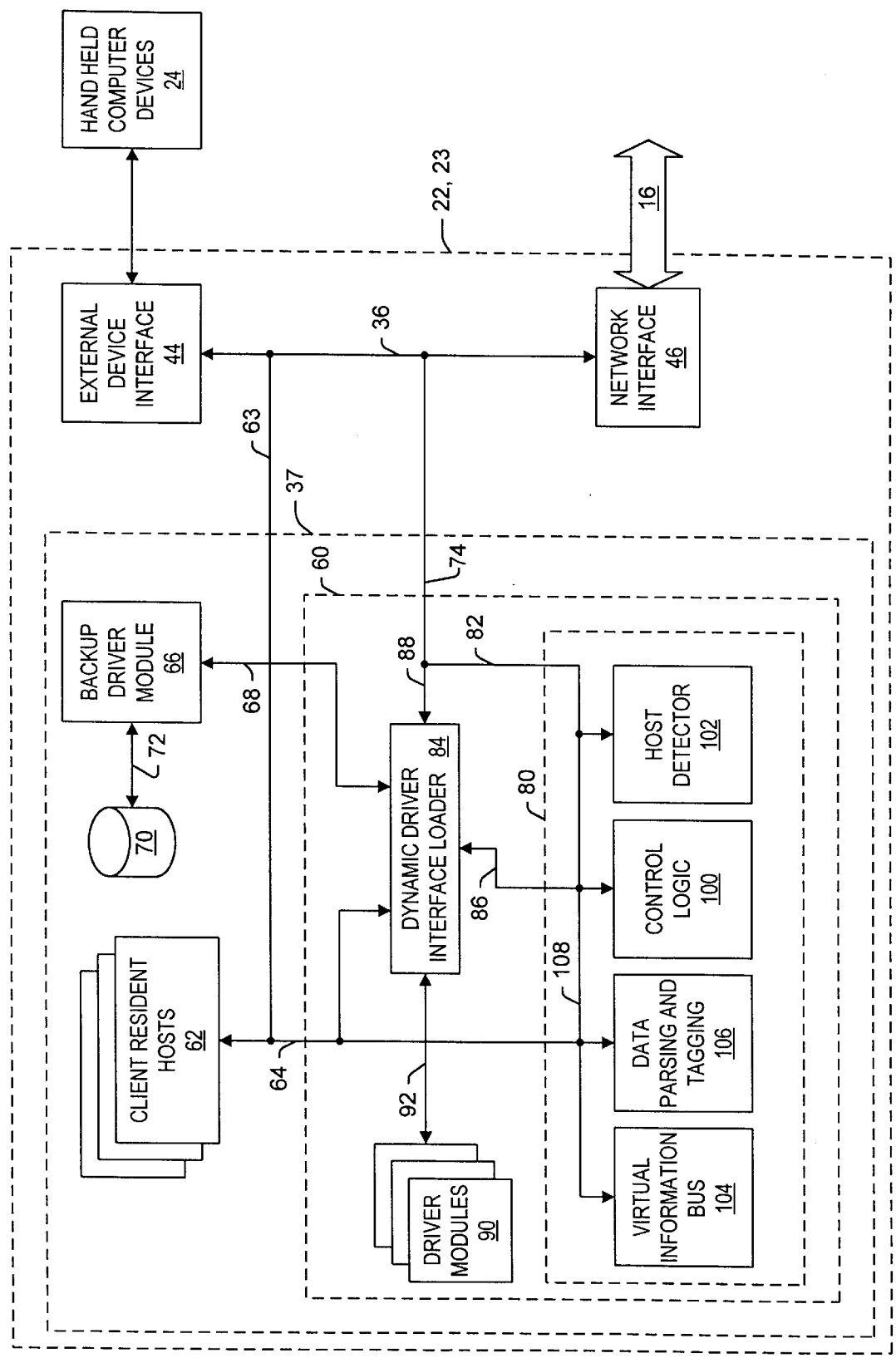
FIG. 3 is a detailed block diagram of user end software modules of the data exchange process including a controller module, a dynamic application-driver loader module, and a plurality of driver interface modules each being associated with a particular type of data host.

FIG. 3 shows a detailed block diagram at 50 of user-end modules of the data exchange process of the present invention which are resident at each of the client computer systems 22 and 23 of the user site 12 and 14 (FIG. 1) respectively, the user-end modules being stored in the form of computer executable code in the computer readable memory 37 (FIG. 2) of the client computer system, and executed by the processing unit 34 (FIG. 2) of the computer system.

The computer readable memory 37 has computer executable code stored therein used for implementing: a client-side data exchange process module 60 for implementing client-side functions of the automatic transparent data exchange process according to the present invention; a plurality of client resident data hosts 62, including application programs and data bases, which communicate with the system bus 36 as indicated by a line 63, and which also communicate with the data exchange process module 60 as indicated by a line 64; a back-up storage driver module 66 which communicates with the data exchange process module 60 as indicated by a line 68; and a back-up storage unit 70 which communicates with the back-up storage driver module 66 as indicated by a line 72. The data exchange process module 60 communicates with the external device interface 44 and network interface 46 via the system bus 36 as indicated by a line 74. The client resident data hosts 62 are executed by the processing unit 34 (FIG. 2) of the client computer system.

As mentioned above, the computer readable memory 37, which stores the data exchange process module 60 and client resident data hosts 62, is comprised of both main memory and mass storage. In a preferred embodiment of the present invention, the data exchange process module 60 and client resident data hosts 62 are assumed to be stored in the non-volatile memory 40 (FIG. 2), or mass storage, when "inactive", and are loaded by the operating system into the volatile memory 38 (FIG. 2) when "activated".

The data exchange program module 60 includes: a client-side control module 80 which communicates with the external device interface 44 and network interface 46 via the system bus 36 as indicated by a line 82 and the line 74; a dynamic driver interface loader module 84 which communicates with the client-side control module 80 as indicated by a line 86, and which also communicates with the external device interface 44 and network interface 46 via the system bus 36 as indicated by a line 88 and the line 74, and which further communicates with the client resident data hosts 62 and back up driver module 66 as indicated by the lines 64 and 68 respectively; and a plurality of client resident driver interface modules 90 in accordance with the present invention which communicate with the driver loader 84 as indicated by a line 92.

The client-side control module 80 includes: a control logic module 100 providing client command functions for implementing the data exchange process of the present invention; a host detector module 102 for automatically determining characteristics of selected ones of the client resident data hosts 62; a virtual information bus module 104 for temporarily storing data in accordance with a standard intermediate data format during an interim phase of data exchange operations according to the present invention; and a data parsing and tagging module 106 which provides automatic parsing and tagging of plain text data extracted from a source data host having a plain text type of data format as further explained below. Each of the modules 100, 102, 104, and 106 communicates with each other as indicated by a line 108, and each of these modules also communicates with the client resident data hosts 62 as indicated by lines 64 and 108. Each of the modules 100, 102, 104, and 106 further communicates with the dynamic driver interface loader 84 as indicated by the lines 86 and 108.

The data exchange program module 60 provides for a user to transfer data between a user selected source host, and a user selected destination host. Each of the source and destination hosts may be selected from: one of the client resident data hosts 62 of the corresponding one of the computer systems 22 and 23; one of the client resident data hosts 62 running on a remote one of the computer systems 22 and 23; a data host, such as "form", provided by the web server 21 at the remote web site 20; or one of a plurality of data hosts running on one of the hand-held computer devices 24.

In one embodiment, the data exchange program module 60 is executed by a windows type operating system (OS) running on one of the user computer systems 22 and 23 (FIG. 1). As an example, the first user computer system 22 is running a MacIntosh OS, and the second user computer system 23 (FIG. 1) is running a Microsoft Windows OS.

In the preferred embodiment, upon activation and execution of the data exchange program module 60 by the processing unit 34 (FIG. 2), a floating tool bar (not shown) is displayed on the display device 42 (FIG. 2) of the corresponding computer system. The floating tool bar includes: a source data host window (not shown) identifying a data host currently being displayed in an "active window" of the OS on the display device; and a plurality of destination data host icons (not shown) representing a selectable destination data host.

In the preferred embodiment, the data exchange program module is used for exchanging a data block representing address information from a source host to a destination host.

In order to transfer a block of data, the user highlights plain text or data fields in the source host and selects a destination icon associated with a desired destination host. Each of the client resident hosts 62 may be specified by the user of the data exchange program to function as a local source host, or may be called by the user to function as a local destination host. Each of the client resident hosts 62 is loaded into the working volatile memory unit 38 (FIG. 2) upon activation of that particular local host. Each of the client resident hosts 62 may be activated directly by the user, or may be activated automatically by the data exchange program module 60 upon selection of a corresponding one of the destination host icons.

The control logic module 100, which communicates with each of the client resident data hosts 62, is operable to determine which of the data hosts 62 is currently activated in the OS. The host detector 102 communicates with the currently active host as shown by lines 64 and 108 to determine characteristics of the currently active data host. The detector compares the characteristics of the data host to a local client resides library of stored information relating to a plurality of currently known data hosts.

If the host detector 100 is able to determine the identity of the currently activated host, the detector provides information indicative of that identity to the dynamic driver interface loader 84. The loader 84 then communicates with the local drivers modules 90 as shown by line 92 to determine whether an appropriate driver module compatible with the currently active host is locally available.

As further explained below, if the detector is unable to determine the identity of the currently activated data host, the detector samples data from the currently activated data host, and provides this sampled data to the dedicated index web server 19 (FIG. 1) via the network interface 46, and network 16.

In one embodiment, the data block selected by the user to be transferred from a source host to a destination host includes geographical address information. The address information may include any or all of a first name, a last name, a personal title, a street address, a city, a state, a country, and a zip code. Different countries have different address formats. Different ones of the client resident hosts 62 include disparate internal data formats. Examples of data hosts which are supported by the data exchange process of the present invention include MS Word, MS Excel, IBM WorkPad, Cc:mail, Eudora, WinFax, ACT!, Vcard, QuickBooks, any PIM/PDA, GoldMine, Maximizer, OutLook, Organizer, Janna, WordPerfect, MS Dialer, FedEx Ship, Palm Pilot, Netscape Navigator, Internet Explorer, Smart Label Printer, Card Scan, 88 Million/CD USA, Smart Business Card Reader, and UPS Online.

The data exchange program module 60 acts as an intermediate interpreter providing communication between a source host and a destination host, and as such must communicate with each host separately. As further explained below, each of the driver modules 90 includes a communication layer providing communication between the client side control module 80 and one or more associated ones of the client resident hosts. The communication layers of the driver interface modules 90 implement direct communication methods, and indirect communication methods.

Direct communication methods include TCP/IP data exchange (DDE), object linking and embedding automation (OLE automation), DLL based API, and SNMP. Indirect communication methods include file analysis, controlled clipboard transfers, display text analysis (matching text display with various fonts), hooking into calls to standard OS text drawing functions, insertion of keystrokes, hooking onto a print stream, extraction of data from standard UI controls, and sending HT7P/FTP/Finger requests.

Specialized communication methods are used for cases wherein one of the data hosts is a "form" provided by the web server 21 (FIG. 1) to the client computer system via the network 16 (FIG. 1). Typically, such a form is accessed via browser type application program executed by the client computer system. CGI provides a way for browsers on different platforms to interact with data bases on equally diverse platforms. Through CGI scripts, nearly every type of data access is possible. The general principles of data base access are the same for any web server that supports CGI. CGI scripts provide a means for passing data between web servers and other applications. Most data base gateways use CGI in some manner. Some web servers allow the use of dynamic data exchange (DDE) and object linking and embedding (OLE) in the windows environment to exchange data directly between a web server and various applications.

A difficulty with CGI is that it always requires programming. CGI is only an interface, or a front-end. The data is still contained in a data base on the back-end, or the part of the information system that is hidden from the user by the facade of the interface. In order to link the front-end and back-end, custom scripts must be written to link specific data bases to the generic interface. Retrieving data from a back-end data base can be done in one of two ways. The simplest is to read the data base files directly in their native format. If this is not possible, the CGI program must communicate with the data base server. If the data base files cannot be read directly, it is necessary to communicate with the data base server, which reads the files and sends the results back to the client (CGI program). This is only possible for data bases that implement a standards-based server such as in a structured query language (SQL) server or open data base connectivity (ODBC) server. In this manner, any SQL or ODBC client can communicate with the data base server. Nearly all data bases are either SQL or ODBC compatible including Informix, SyBase, Oracle, Borland, Paradox and InterBase, Microsoft Access, and Lotus Approach.

Data file formats may be generally categorized as plain text data formats and parsed data formats. In parsed data formats, the data is parsed into discrete fields having tags associated therewith to identify the contents of each field or have specific delimiters between fields. For example, for a United States address, the fields of a parsed data format may include a first name field, a last name field, a title field, a street address field, a city field, a state field, and a country field. For an address other than a United States address, the fields of a parsed data format may include other appropriate fields. In accordance with plain text data formats, the data is not parsed into discrete fields having tags associated therewith to identify the type of information stored in the associated field.

If a data block (e.g., address information) extracted from a source host is formatted in accordance with a plain text data format, it is not readily apparent to prior art computer applications which portions of the plain text data indicate names, a street address, a city, a state, or a country. Therefore, a special case difficulty arises where a data block having a plain text data format is to be transferred to a destination application which uses a parsed data format because it is not readily apparent to computer programs which portions of the plain text data are to be inserted into the fields of an entry of the destination host. As further explained below, if the data block (e.g., address information) selected by the user to be transferred to a destination host is in the form of plain text, then the data parsing and tagging module 106 performs an automatic parsing and tagging process in accordance with the present invention.

Figure 4:
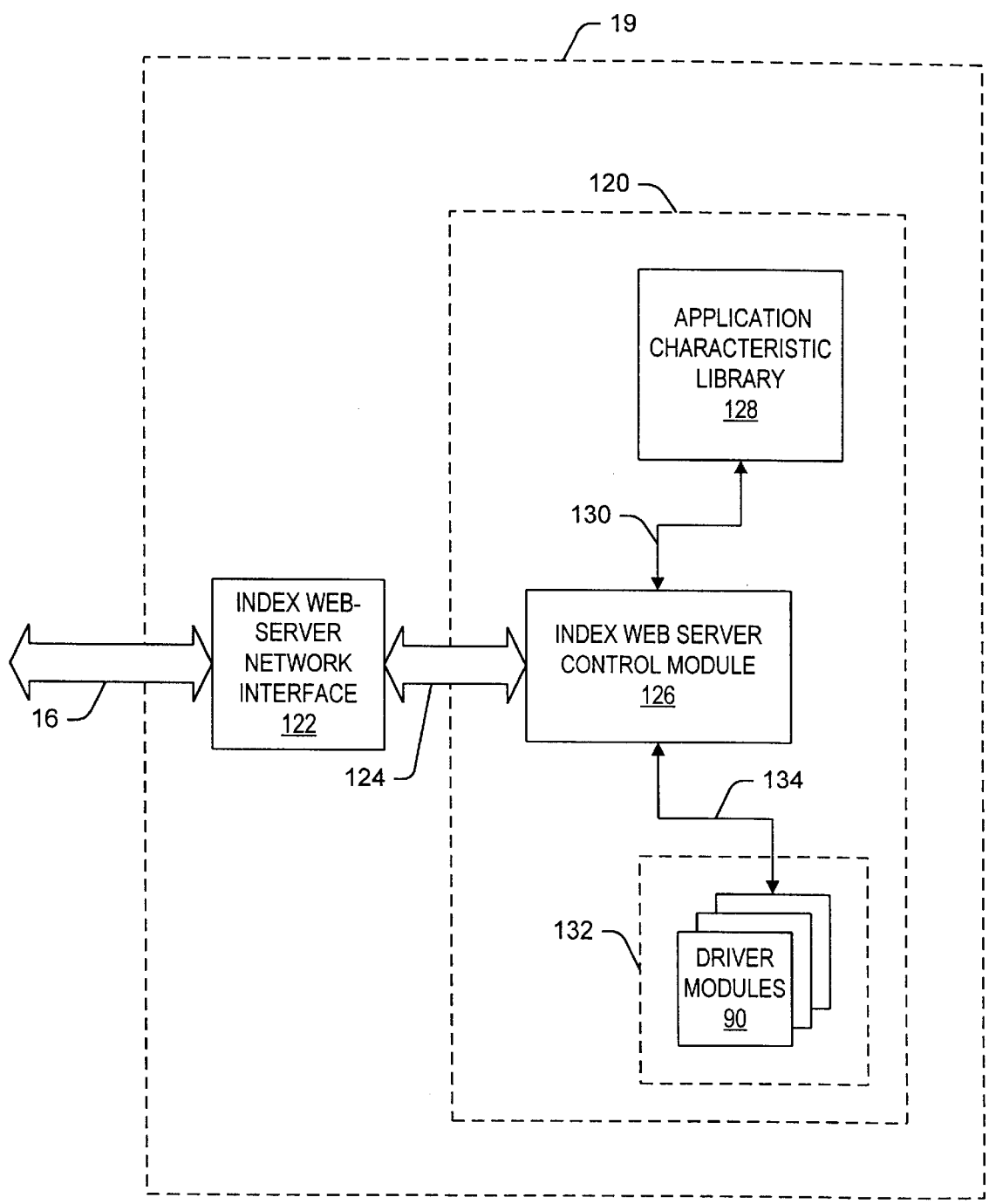
FIG. 4 is a detailed block diagram of remote support software modules of the data exchange process for execution by a dedicated index web server, the modules including a driver downloading control module, an application characteristics library, and a plurality of remotely stored driver modules each being compatible with an associated type of data host.

FIG. 4 is a detailed block diagram of remote support modules of the data exchange process of the present invention which are executed by the dedicated index web server 19 (FIG. 1). In an embodiment, the index web server, which communicates with the client computer systems 22 and 23 (FIG. 1) via the network 16, includes components similar to those of the client computer systems 22 and 23 (FIG. 2). The index web server includes a computer readable memory 120, and an index web-server network interface 122 connected with the computer readable memory 120 as indicated by a line 124. The interface 122 provides communication between the index web server and the client computer systems via the network 16. The computer readable memory 120 include remote support software modules stored in the form of computer executable code which, when executed by a processing unit (not shown) of the index web server, implement a sub-process of the data exchange process for automatically downloading a driver interface module to the client computer system.

The computer readable memory 120 includes, stored therein: an index web-server control module 126; an application characteristic library module 128 which communicates with the index web-server control module 126 as indicated by a line 130; and an index web server driver interface storage module 132 for storing a plurality of remotely accessible ones of the driver interface modules 90. The index web server control module communicates with the remotely accessible driver interface modules as indicated by a line 134.

The index web server control module 126 analyzes sampled data received from the client computer systems 22 and 23 (FIG. 1) via the network 16. The sampled data is sampled by the client-side control module 80 (FIG. 3) from a currently activated data host running on the client computer system. The index web-server control module analyzes the sampled data by comparing it to data stored in the application characteristic library module 128 in order to determine the identity of the data host from which the sample data has been extracted.

If the index web-server control module determines the identity of the host from which the sampled data has been sampled, the control module then determines whether one of the remotely accessible driver modules 90 is compatible with this particular data host. If so, the control module 126 provides the associated one of the drivers 90 to the corresponding client computer via the network interface 122 which the client computer will incorporate into its executable code.

Figure 5:
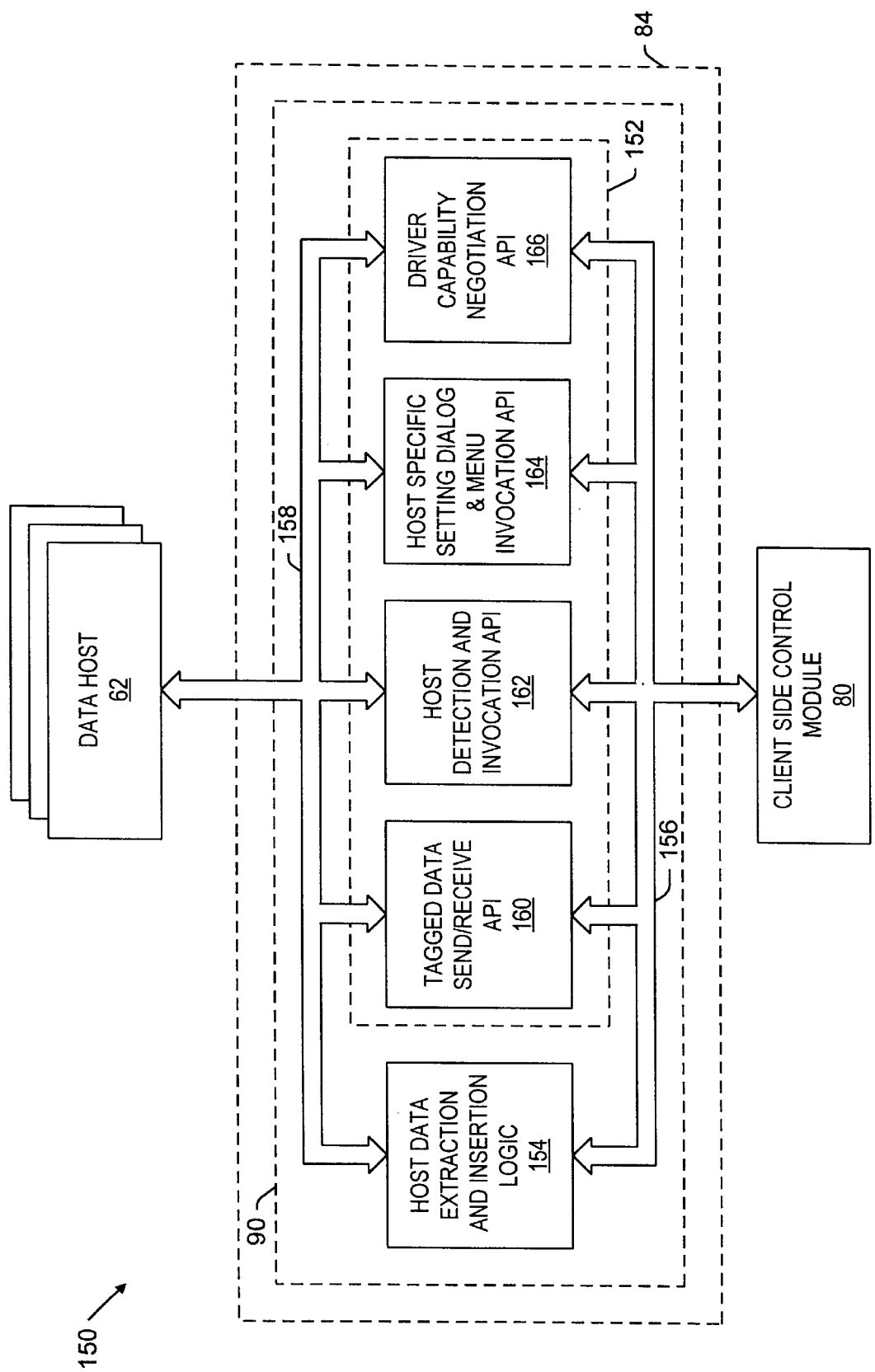
FIG. 5 is a detailed block diagram of one of the driver interface modules of FIGS. 3 and 4 as loaded by the driver loader module of FIG. 3 in order to provide communication between an associated data host and a virtual information bus of the controller module of FIG. 3.

FIG. 5 shows a block diagram at 150 of one of the driver interface modules 90 (FIG. 3) as loaded by the dynamic interface driver loader 84 (FIG. 3) and coupled to provide communication between the client-side control module 80 and an associated one of the client resident hosts 62. Note that in the case wherein one of the data hosts is a "form" provided by a web server, the associated one of the client resident hosts is a browser type of application. Each driver interface module 90 includes: a common application program interface (API) 152; and a host data extraction and insertion logic module 154 which communicates with the common API 152, and the data exchange controller 80 as illustrated by lines 156. The host data extraction and insertion logic module and common API 152 also communicate with the corresponding one of the client resident data hosts 62 as illustrated by lines 158. The common API 152 includes a tagged data send and receive API 160, a host detection and invocation API 162, a host specific setting dialog and menu invocation API 164, and a driver capability negotiation API 166.

The host detection and invocation API 162 determines whether a particular one of the data hosts is activated, and, if not, provides for invoking it. In the case of a host specific driver interface module, the host detection and invocation API 162 provides for determining whether the data host is currently running, and if not, requests the driver to activate the data host. In the case wherein one of the source or destination data hosts is running on a remote computer, the host detection and invocation API 162 determines if the remote computer is responsive and establishes a communication connection.

In the case in which the data host is a database file, the host detection and invocation API 162 is used to determine if the database file exists and, if it does, provides for loading it. In some cases like a driver for a handheld device, it might not be possible to use the invocation function of the API 162 in which case the API 162 will return without doing anything, except setting an appropriate error code for subsequent handling and reporting to the operator.

The tagged data send and receive API 160 provides for extracting data in tagged form from the driver and providing the tagged data to the driver. In the case in which tagged data is extracted using the API 160, the tagged data is placed on the virtual information bus 104 (FIG. 3) from which any other driver interface module (either user chosen or determined automatically) may access the tagged data and provide it in the format required by a corresponding data host.

The host specific setting dialog and menu invocation API 164 provides for the user to specify settings for each driver interface module. For example, in the case wherein the data host is an address book application program, the user may instruct the driver interface module to use a home phone number as a main phone and disregard any other phone number. In the case wherein the data host is a database, the user may specify which database file the driver is to open for executing a data exchange. These settings may be specified either via a settings dialog, or via context menus which appear on the driver icon on the display device 42 (FIG. 2). Using the API 164, the user may also obtain icons representing each driver interface module. The icons are then shown on the toolbar on the display device for quick access.

The driver capability negotiation API 166 provides for determining in a generic manner the characteristics of the data host supported by the driver interface module. The driver capability negotiation API 166 indicates to the client-side control module 80 whether the driver desires only to transfer data to the host, transfer data out of the host, or do both. The driver may also indicate to the controller whether or not it has a settings dialog, whether it has a specific menu etc.

Figure 6:
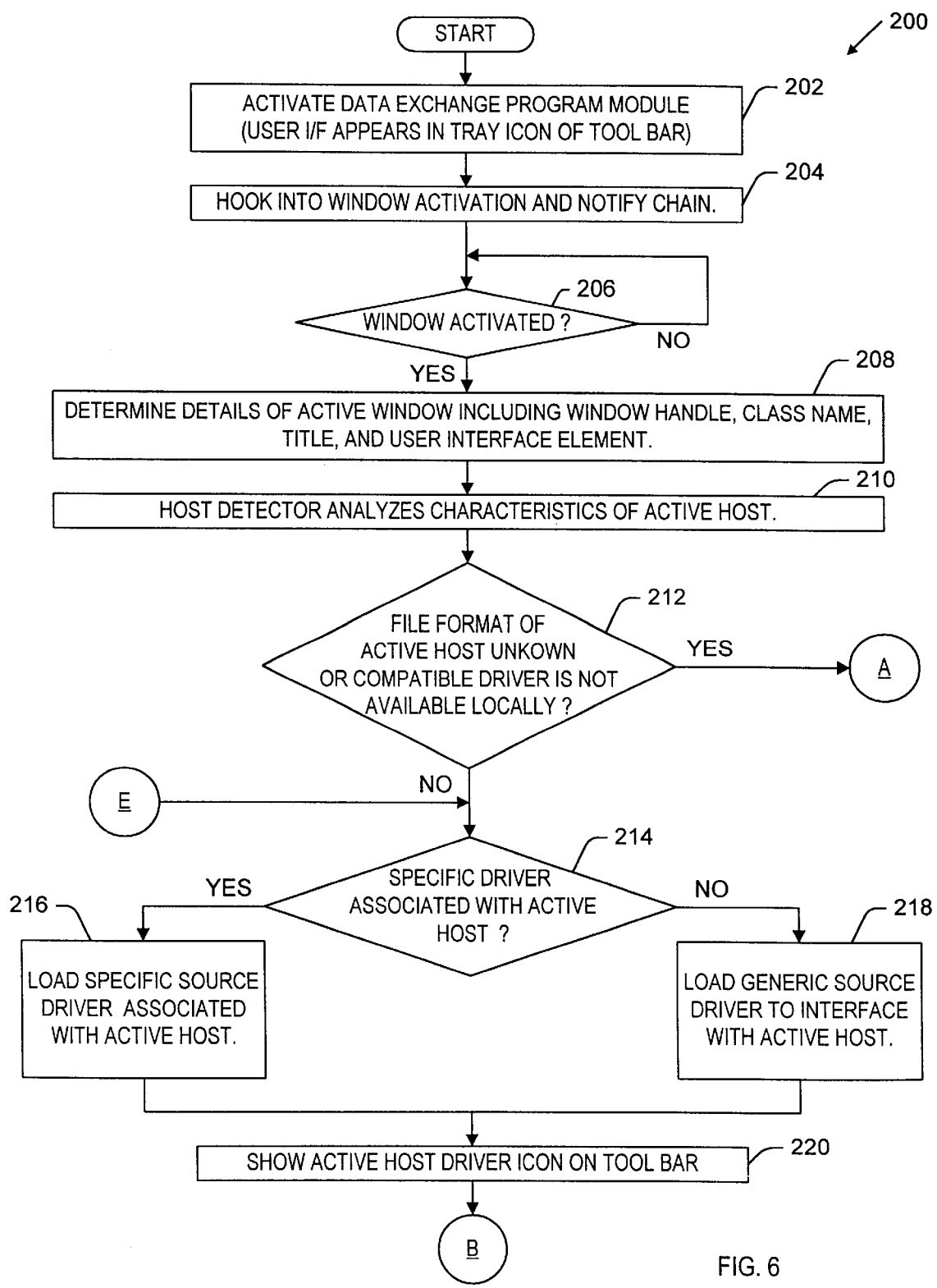
FIGS. 6 and 7 are flow diagrams illustrating a data exchange process according to the present invention.

FIG. 6 shows a flow chart at 200 illustrating a data exchange process in accordance with the present invention. The data exchange process 200 begins with step 202 in which the data exchange program module 60 (FIG. 3) is activated. In an embodiment, this step includes: (1) loading executable program instructions of the program module from the non-volatile memory unit 40 (FIG. 2) to the volatile memory unit 38 (FIG. 2) of the client computer system; and executing the instructions via the processing unit 34 (FIG. 2) causing a toolbar to be displayed on the display device 42 (FIG. 2) of the client computer system. As further explained below, in the preferred embodiment of the present invention, the toolbar includes: a "source icon" representing a source data host from which data is to be exported in accordance with the data exchange process; and a plurality of possible destination icons representing destination hosts which may be selected to receive data exported from the source host. Each of the source and destination hosts may be selected from hosts including: the client resident applications programs 62 (FIG. 3) executed by the processors of the client computer systems 22, 23; an application program, or host, executed by the processing unit 48 (FIG. 2) of one of the handheld devices 28, 30 (FIG. 1) coupled with one of the client computer systems; and a "form" provided, or downloaded, from the web server 21 (FIG. 1) to one of the client computer systems via the network 16 (FIG. 1) in association with a web browser type program executed by the processing unit 34 (FIG. 2) of the client computer system.

The driver interface modules 90 (FIGS. 3 and 4) include: specific interface driver modules for interfacing with data hosts specifically supported by the data exchange process; and generic interface driver modules for interfacing with data hosts determined to have a data file format compatible with a particular one of the general driver modules. In a presently preferred embodiment of the present invention, specifically supported hosts include MS Word, MS Excel, IBM WorkPad, Cc:mail, Eudora, WinFax, ACT!, Vcard, QuickBooks, any PIM/PDA, GoldMine, Maximizer, OutLook, Organizer, Janna, WordPerfect, MS Dialer, FedEx Ship, Palm Pilot, Netscape Navigator, Internet Explorer, Smart Label Printer, Card Scan, 88 Million/CD USA, Smart Business Card Reader, and UPS Online.

Because there is such a vast assortment of commercially available application programs and data bases, it is prohibitive in both time and cost to accommodate all potential combinations of driver interface modules. Therefore, the data exchange process provides: a method for determining the file format characteristics of a data host which is not specifically supported; and means for determining and providing a generic driver module, or interface, for interfacing with the data host which is not specifically supported.

From step 202, the depicted process proceeds to step 204 in which the program module "hooks into" the windows OS of the client computer system to enable the reading of control information used by the windows OS while passing the information to other currently activated program applications in a "notification chain". It is then determined at 206 whether any window of the windows OS is currently activated ("brought to the front", or "clicked on") and if so, the process proceeds to step 208. If it is determined at 206 that no window is currently activated, the data exchange process repeats the determination at 206 until a window is activated.

In step 208, the program module determines characteristics of the currently activated window including window handle, class name, title, and user interface elements, all of which are functions of the windows OS and which provide information from which the identity of the currently activated data host may be determined. Class name is a common name provided to all instances of an application. It represents the application itself rather than the various running instances of the application. It is possible, though rare, for two applications to have the same class name, hence a class name generally uniquely defines a running application. Title is the text shown in the title bar of an application. Each instance of an application may have a different title (e.g., "Microsoft Word—Document1" or "Microsoft Word—Document2"). The window handle is a unique number identifying a window. For a single session, window handles are unique for all running applications, although they may be reused for other windows once an application exits. User interface elements constitute elements which the user sees on the screen (e.g., checkboxes, edit controls, menu items, icons, etc.). In one embodiment, the currently activated application program is assumed to be the source host.

However, in alternative embodiments of the present invention, the source host may be selected by the user of the data exchange process.

In step 210, the host detector 102 (FIG. 3) of the program module analyzes characteristics of the currently activated data host. The application detector may be able to detect the identity of the currently activated data host via the window handle, class name, title, and user interface elements received via the windows OS notification chain in step 210. However, if the identity of the currently activated host is not readily discernible via the windows OS notification chain, then the detector determines the identity of the host by determining characteristics of its user interface including a number of edit controls available, the text in selected ones of the fields, and a number of menu items available. As a last resort, the application detector samples data from the currently activated host and analyzes its internal data format to determine its identity.

Analysis of the internal data file format of the host includes referring to a local library of data file format characteristics stored in the client memory unit 37 (FIG. 2) of the computer system to determine the data file format characteristics. If the detector is able to match the format characteristics of the host with an entry in the local library, the detector then determines an appropriate one of the driver interface modules 90 (FIG. 3) to provide an interface between the associated host and the client side control module 80 (FIG. 3).

The process proceeds from step 210 to 212 at which a condition is tested. Testing of this condition includes determining: (1) whether the data file format of the currently activated host is unrecognizable by the detector 102 (FIG. 3), that is whether the stored library of data file format characteristics does not include an entry matching the data file format characteristics of the currently activated host; and (2) whether a compatible driver interface module 90 is locally available in the memory storage 37 (FIG. 3) of the client computer system. If the data file format is not recognizable, or none of the locally resident driver interface modules is compatible with the source host, the process proceeds from 212 to "A" (to FIG. 8) to implement a sub-process for automatically downloading a compatible one of the remotely accessible driver modules 90 which are remotely stored in the memory space 132 (FIG. 4) of the index web server 19 (FIG. 4).

If the data file format is recognizable, and one of the local driver modules is compatible with the host, the process proceeds from 212 to 214 at which it is determined whether a specific driver module is associated with the currently activated host. If the currently activated host has an internal data file format which is a plain text type of format, then it will be determined at 214 that the host does not have a specific driver associated with it.

If it is determined at 214 that a specific driver module is compatible with the host, the process proceeds to step 216 in which the control logic module 100 (FIG. 3) instructs the loader module 84 (FIG. 3) to load a specific type one of the driver modules to act as a source driver module. Alternatively, the process proceeds to step 218 to load a generic type driver module.

After a compatible driver module has been loaded by loader module 84 (FIG. 3) in accordance with step 216 or step 218, the process proceeds to step 220 in which a driver icon associated with the currently loaded driver module is displayed on the tool bar on display device 42 (FIG. 2). From step 220 the process proceed to "B" (to FIG. 7).

Figure 7:
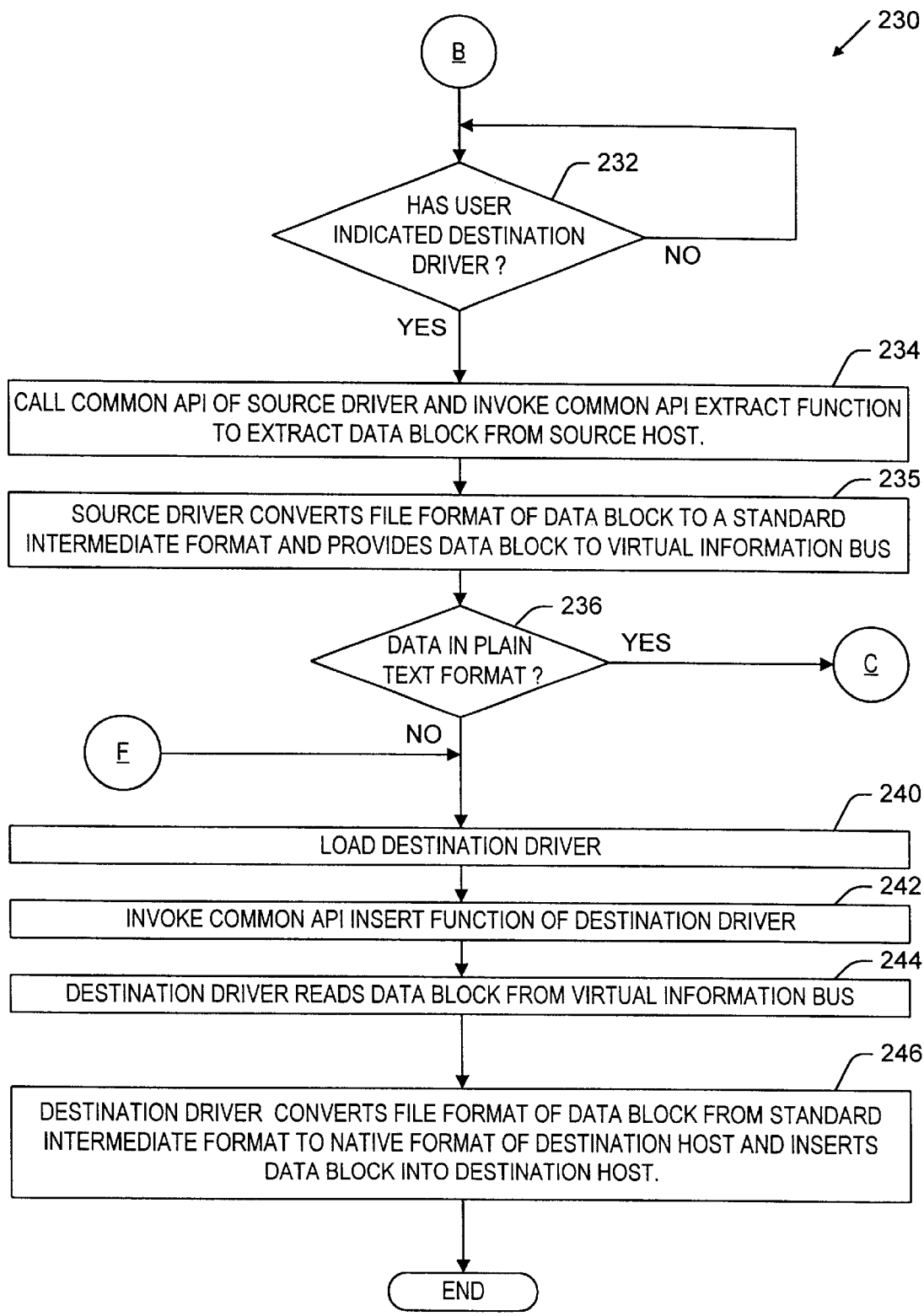

FIG. 7 shows a flow diagram at 230 illustrating further steps of the data exchange process 200 (FIG. 6). The depicted process proceeds from "B" (from FIG. 6) to 232 at which it is determined whether the user has indicated a destination host. In one embodiment, the user may select a destination host by selecting one of the destination driver icons displayed on the tool bar. In alternative embodiments, the process may allow for the user to type a name of a destination host, or default to an activated host. If it is determined at 232 that the user has indicated a destination host, the process proceeds to step 234. Alternatively, the process repeats step 232 until the user indicates a destination host, after which the process proceeds to step 234. In step 234, the control logic module 100 (FIG. 3) calls the common API 152 (FIG. 5) of the source driver module 90 currently loaded in loader module 84 (FIG. 3), and invokes a common API extract function to extract a data block from the source host. In step 235, the source one of the driver interface modules 90 (FIG. 3) converts the file format of the extracted data block to a standard intermediate data file format, and provides the data block to the virtual information bus 104 (FIG. 3) of the client side control module.

From step 235, the process proceeds to 236 at which it is determined whether the data block extracted from the source host in step 234 has a plain text type of data format, that is data which is not parsed and tagged. If so, the process proceeds to "C" (to FIG. 11A) to implement a sub-process for automatically parsing and tagging a block of plain text data representing a geographical address. If it is determined at 236 that the extracted data block is not in a plain text data format, it is assumed that the data block has a format wherein data is parsed into fields which are tagged to identify the data in the discrete fields, and the process proceeds to step 240.

In step 240, control module 100 (FIG. 3) instructs loader module 84 (FIG. 3) to load a particular one of the driver interface modules which is compatible with the destination host. In step 242, the control logic module 100 (FIG. 3) invokes a common API insert function of the destination driver module which is implemented by the data extraction and insertion logic module 154 (FIG. 5). In step 244, module 154 (FIG. 5) of the destination driver module reads the data block from the virtual information bus 104 (FIG. 3). In step 246, module 154 (FIG. 5) converts the internal data file format of the data block from the standard intermediate format to a native format of the destination host, and inserts the data block into the destination host.

Figure 8:
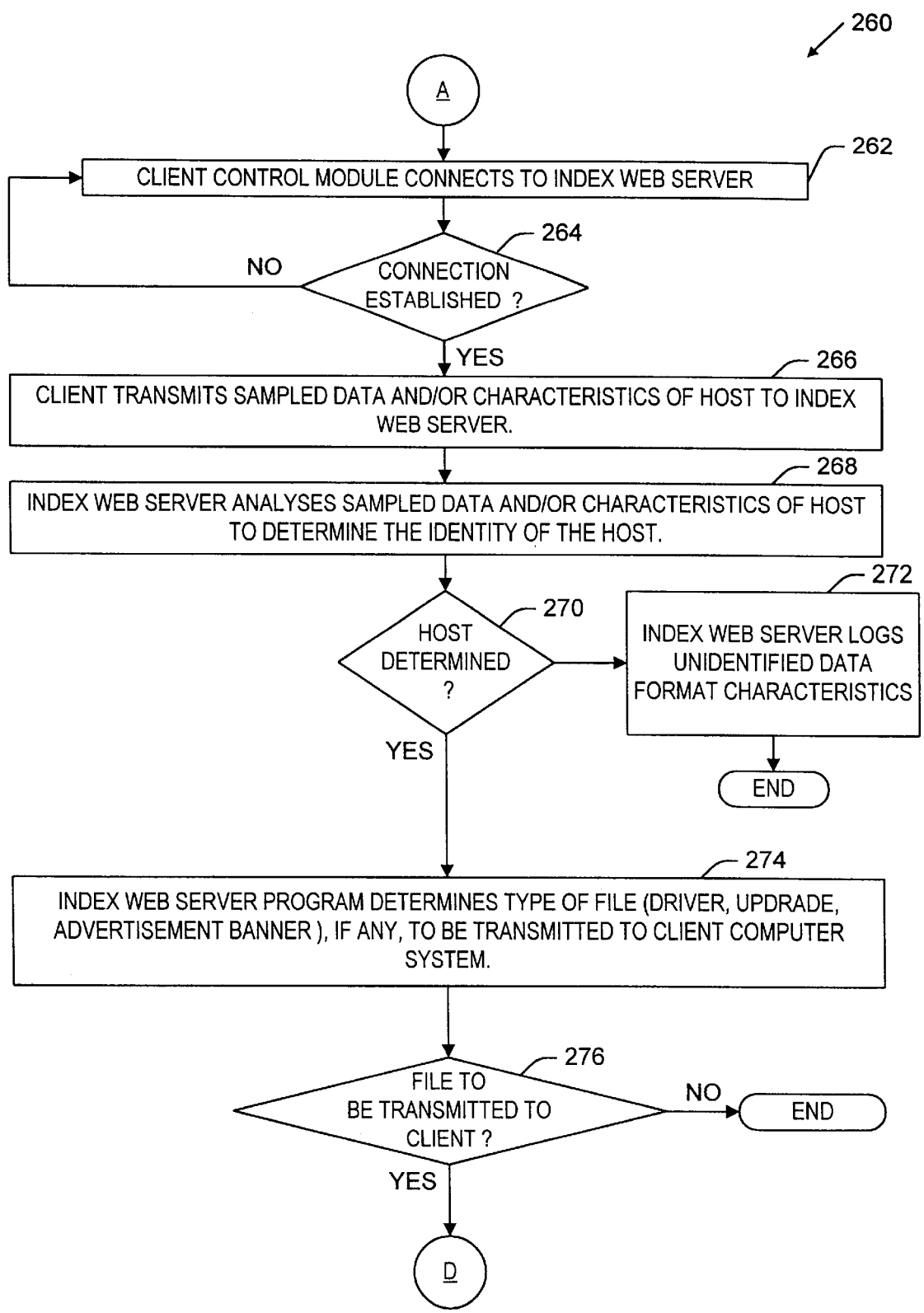
FIGS. 8 and 9 are flow diagrams illustrating a sub-process of the data exchange process for automatically downloading an appropriate driver module from the dedicated index web server of FIG. 4.

FIG. 8 shows a flow diagram at 260 illustrating a sub-process of the data exchange process for automatically downloading an appropriate driver module from the index web server 19 (FIG. 4). The sub-process 260 is invoked during the data exchange process 200 (FIG. 6) if it is determined at 212 (FIG. 6) that the internal data file format of a currently activated host is "unrecognizable" as explained above, or none of the locally resident driver modules 90 (FIG. 3) stored in the client computer system is compatible with the currently activated host. The process 260 proceeds from "A" (from FIG. 6) and proceeds to step 262 in which the control logic module 100 (FIG. 3) connects to the index web server 19 (FIG. 4) via the network 16 (FIG. 4). It is then determined at 264 whether a connection has been established between the client computer system and the index web server, and if so, the process proceeds to step 266. Alternatively, the process repeats steps 262 and 264 until a connection is established.

In step 266, the control logic module transmits data sampled from the host, and/or other information indicative of characteristics of the host, to the index web server via the network. In step 268, the index web server control module 126 (FIG. 4) analyzes the data and/or characteristics of the host to determine its identity. The index web server control module searches the application characteristic library 128 (FIG. 4) to determine a match between the data sampled from the host and an entry of library 128. It is then determined at 270 whether the identity of the particular host has been determined by the index web server. If not, the index web server control module logs the unidentified sampled data by storing it in a memory location of the index web server 19 (FIG. 4).

If it is determined at 270 that the identity of the host has been determined, the process proceeds to step 274 in which the index web server determines a type of file, if any, to be transmitted to the client computer system via the network. Based on the identity of the host and an action list, the index web server transmits one or more files selected from: a driver module compatible with the host; an upgraded executable file for the active application program; and a file comprising an advertisement banner. The action list, maintained for each host, is used to track the type of file to be transmitted to each particular host. If, for example, the action required is to download an advertisement banner, a JPEG or GIF file may be downloaded for display. From step 274, the process proceeds to 276 at which it is determined whether a file is to be transmitted to the client computer system from the index web server. If no file is to be transmitted, the process ends. If a file is to be transmitted, the process proceeds from 276 to "D" (to FIG. 9).

Figure 9:
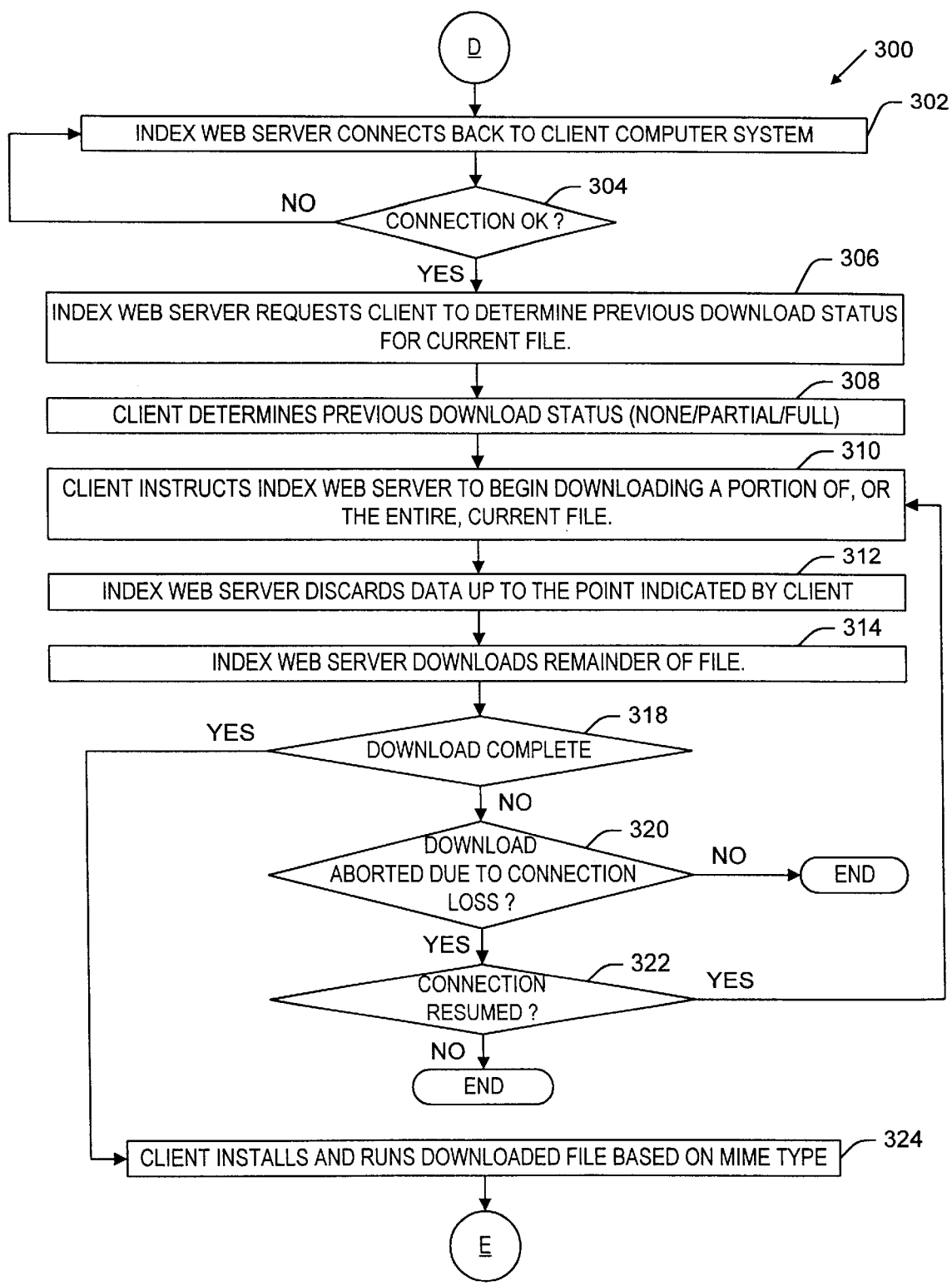

FIG. 9 shows a flow diagram at 300 depicting further steps of the sub-process 260 (FIG. 8) for automatically downloading an appropriate driver module from the index web server. The depicted sub-process proceeds from "D" (from FIG. 8) to step 302 in which control module 126 (FIG. 4) establishes a connection with the client computer system via the network. It is then determined at 304 whether the desired connection has been established, and if so, the sub-process proceeds to step 306. If the connection has not been established, the process executes steps 302 and 304 until the desired connection is established. In step 306, the index web server control module requests the client computer system to determine a previous downloading status for a current file to be downloaded from the index web server. In step 308, the client side control module 80 (FIG. 3) determines the previous downloading status for the current file. A previously established connection between the index web server and the client computer system may have failed during a prior downloading session after which the current file had been partially downloaded. Both the client side control module and the index web server control module include means for logging a record of a communication failure during a downloading session, the records including information as to how much of the file had been downloaded prior to the communication failure.

In step 310, the client side control module instructs the index web server to begin downloading the current file. In this step, the index web server control module 126 (FIG. 4) determines whether to send the entire contents of the current file or only a portion thereof. The portion to be downloaded is determined based upon the record, if any, of a communication failure during a previous downloading session as described above. In step 312, the index web server control module discards data of the current file, up to a point indicated by the records of the client side control module. In step 314, the index web server control module 126 downloads the appropriate portion or entirety of the current file.

It is then determined at 318 whether the current downloading operation is complete, and if not, the sub-process proceeds to 320 at which it is determined whether the current downloading operation has been aborted due to a communication link failure. If the current downloading operation has not been aborted, it is assumed that the current file has been successfully downloaded and the depicted sub-process ends. Alternatively, if the current downloading operation has been aborted, the sub-process proceeds to 322 at which it is determined whether the current communication connection has been resumed, and if so, the sub-process proceeds back to execute steps 310–320 in an effort to complete the downloading of the current file. If the connection has not been resumed, the process ends.

If it is determined at 318 that the current downloading operation is complete, the sub-process proceeds to step 324 in which the client side control module 80 (FIG. 3) instructs the dynamic driver interface loader module 84 (FIG. 3) to run the downloaded file based on the MIME type. MIME is a standard which determines actions to be taken when a file with a particular MIME extension is encountered. For example, the MIME type of JPG can be set to run a graphics viewer so that upon execution of a file with a JPG extension, the graphics viewer runs and displays the contents of the file. From step 324, the depicted sub-process returns to "E" (to FIG. 6) to resume the data exchange process.

Address Data Parsing and Tagging Process

As mentioned above, if it is determined at 236 (FIG. 7) that a data block extracted from a source host, is formatted in accordance with a plain text data format, the plain text data must be parsed into data portions, each having a corresponding tag associated with it, each of the tags indicating a type of information represented by the corresponding data portion. The data exchange process of the present invention provides an automatic data parsing process.

As further described below, the parsing module 106 (FIG. 3): reads the plain text data which has been extracted from the source host in step 234 (FIG. 7); and parses the plain text data into a plurality of data portions. In one embodiment, the parsing module searches the plain text data for portions (text strings, or patterns) having a highest probability of representing a name, a title, a company, a "street address", a city, a state, a zip code, a telephone number, a fax number, an e-mail address, and a web address.

As further described below, the parsing module includes computer readable instructions which, when executed, perform the steps of: reading the plain text data which has been extracted from the source host; performing preprocessing functions to presort the plain text data into simplified text lines; determining patterns, or text strings, of the data block which match entries stored in a plurality of pattern matching data bases, or libraries; generating a matching probability table including a plurality of probability weight factors indicating, for each of a plurality of identified text strings of the plain text data, the probability that the corresponding text string represents a particular type of information; and processing the plain text data in accordance with a plurality of contextual analysis sub-processes which modify the probability weight factors stored in the matching probability table in order to increase accuracy in determining the probabilities that the text strings represent the particular corresponding types of information.

In the preprocessing stage, the parsing module reads the plain text data, and sorts it into simplified text lines by eliminating columns and eliminating excess spaces, tabs, and punctuation. Each text line is assigned a line number, and each text string within a text line is assigned a corresponding starting position value and a corresponding ending position value. A text string of the plain text data may be identified by a line number, a starting position value, and an ending position value.

Figure 10A:
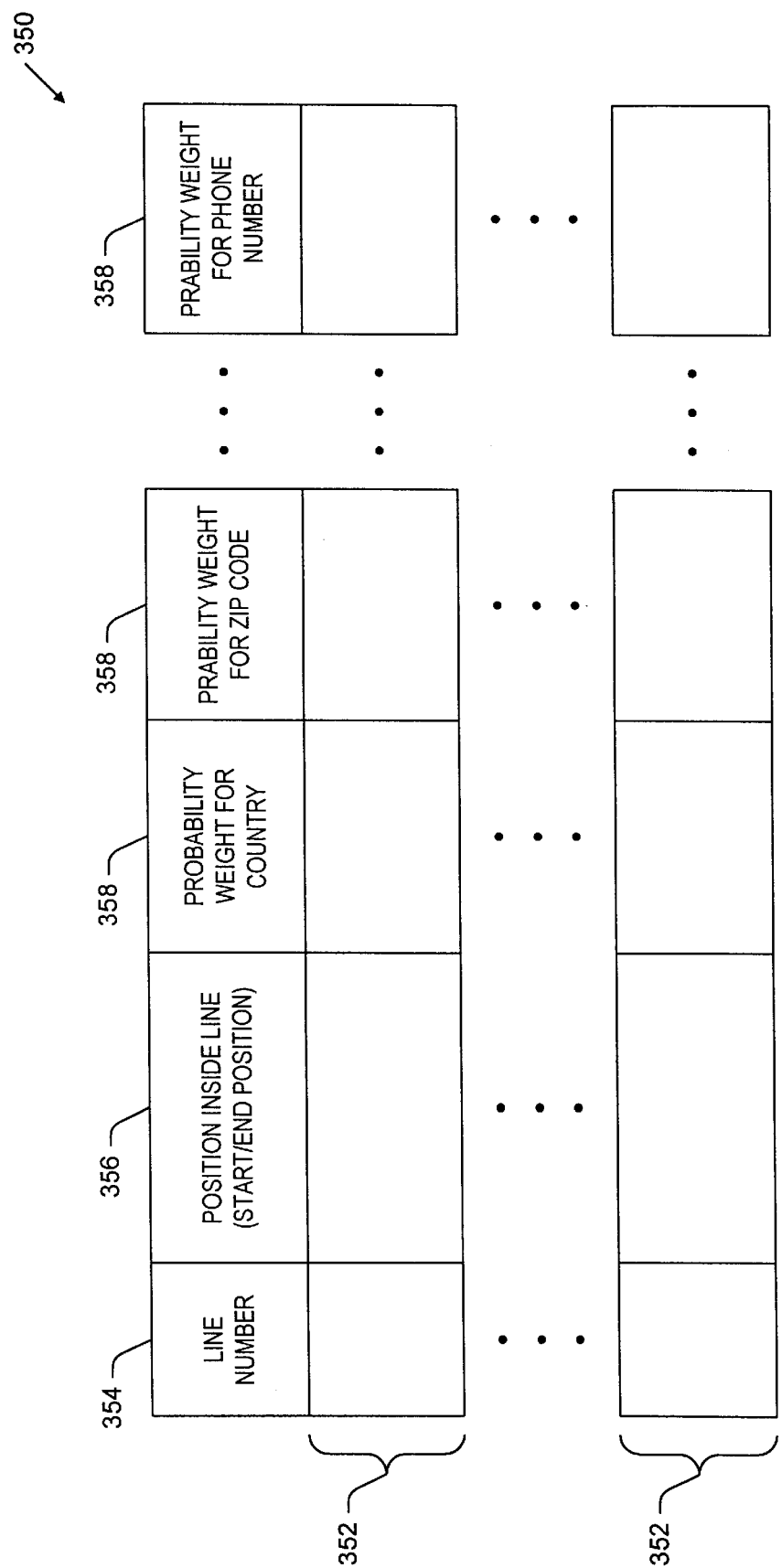
FIG. 10A is a table diagram illustrating a matching probability table generated and used in accordance with an address data parsing sub-process of the data exchange process of FIGS. 6 and 7.

FIG. 10A shows a table diagram at 350 illustrating a preferred embodiment of a matching probability table generated and used by the parsing module 106 (FIG. 3) in accordance with the address data parsing process. The matching probability table 350 is stored in memory unit 37 (FIG. 2) of the client computer system. The matching probability table 350 includes a plurality of rows 352, one for each identifiable text string of the text lines of the plain text data. Each row includes columns for storing information identifying a corresponding text string, and a plurality of probability weight factors, each indicating a probability that the corresponding text string represents a particular portion of address information. Specifically, for each of the rows 352, the matching probability table 350 includes: a first column 354 for storing a line number of the plain text data at which a corresponding text string is located; a column 356 for storing a starting position value, and an ending position value indicating the starting and ending positions of the corresponding text string in the corresponding line number indicated in column 354; and a plurality of probability weight columns 358, each of which provides storage for a corresponding probability weight factor indicating the probability that the corresponding text string, identified by the contents of columns 354 and 356, represents one of a plurality of types of address information including a name, a title, a company, a "street address", a city, a state, a zip code, a telephone number, a fax number, an e-mail address, and a web address.

As mentioned, one stage of the address parsing and tagging process includes "pattern matching" in which patterns, or text strings, of the plain text data are compared with entries stored in a plurality of pattern matching data bases, or libraries. Each of the pattern matching databases includes a library of entries including characters and elements to be searched for in the text strings or the plain text data. Entries may include particular words, and particular patterns. In the preferred embodiment, there are eleven pattern matching databases, all of which are loaded from a single database file, "PARSER.DB", which is located in a parser directory. In the preferred embodiment, the parser is encrypted in binary form to prevent reverse engineering. In an alternative embodiment, this file is an ASCII file which makes it very easy to edit the patterns.

Figure 10B:
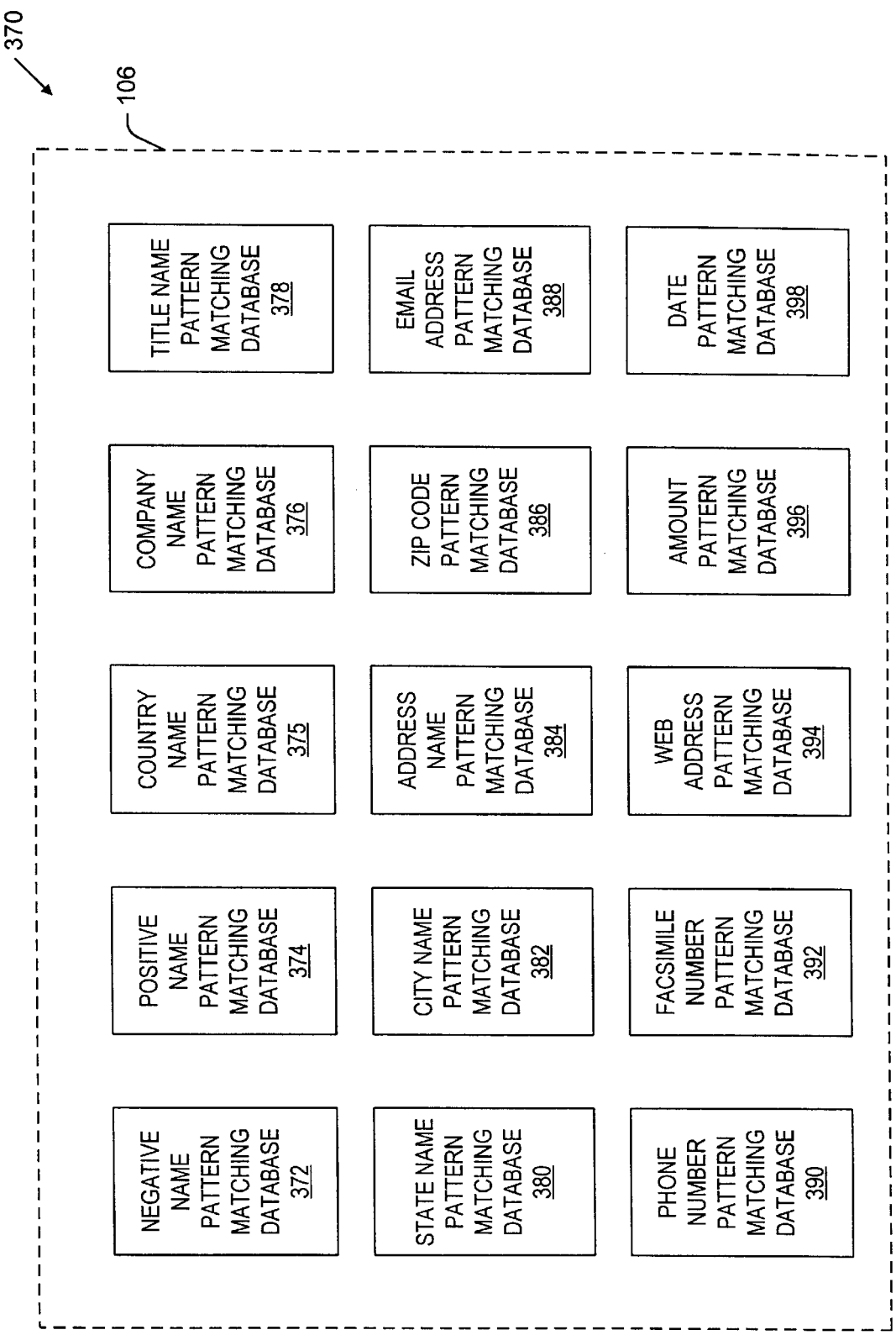
FIG. 10B is a block diagram of pattern matching database modules used in accordance with the address data parsing sub-process of the present invention.

FIG. 10B shows a block diagram depicting at 370 a plurality of pattern matching databases stored in the data parsing and tagging module 106 (FIG. 3) of the data exchange program module 80. The databases include: a negative name matching database 372 which includes a list of words which have a very low probability of occurring in names (e.g., sales, marketing, world, help, orange, etc.) and which are used to determine negative name matches which substantially decrease the probability that a text string matching an entry in this data base is a name; a positive name pattern matching database 374 including name entries for which a match with a text string suggests, with some predetermined probability weight factor, that the matching text sting is a name; a country name pattern matching data base 375 including country name entries for which a match with a text string suggests with some predetermined probability weight factor that the matching text string is a country name, the country entries including all country names and abbreviations thereof; a company name pattern matching database 376 including company entries for which a match suggests that the matching text sting is a company name the company entries including standard company endings (e.g., "Inc.", "company", Ltd., etc.) and also the names of Fortune 500 companies; a title name pattern matching database 378 including title entries for which a match suggests that the matching text sting is a title, the title entries including common titles (e.g., manager, CEO, administrator, etc.); a state name pattern matching database 380 including entries for which a match suggests that the matching text sting is a state name, the state entries including all full state names and state abbreviations (e.g., California and CA); a city name pattern matching database 382 including entries for which a match suggests that the matching text sting is a city name; an address name pattern matching database 384 including entries for which a match suggests that the matching text sting is a "street address"; a zip code pattern matching database 386 including entries for which a match suggests that the matching text sting is a zip code; an e-mail pattern matching database 384 including entries for which a match suggests that the matching text sting is an e-mail address; a phone number pattern matching database 390 including entries for which a match suggests that the matching text sting is a phone number; a facsimile number pattern matching database 392 including entries for which a match suggests that the matching text sting is fax number; a web address pattern matching database 394 including entries for which a match suggests that the matching text sting is a web address; an amount pattern matching database 396 including entries for which a match suggests that the matching text sting is an amount; and a date pattern matching database 398 including entries for which a positive match suggests that the matching text sting is a date. In one embodiment, a different set of pattern matching databases is used for each of a plurality of countries or geographical regions. The default country is USA. For example, the set of data bases for the United States includes data bases having English language entries.

Figure 11A:
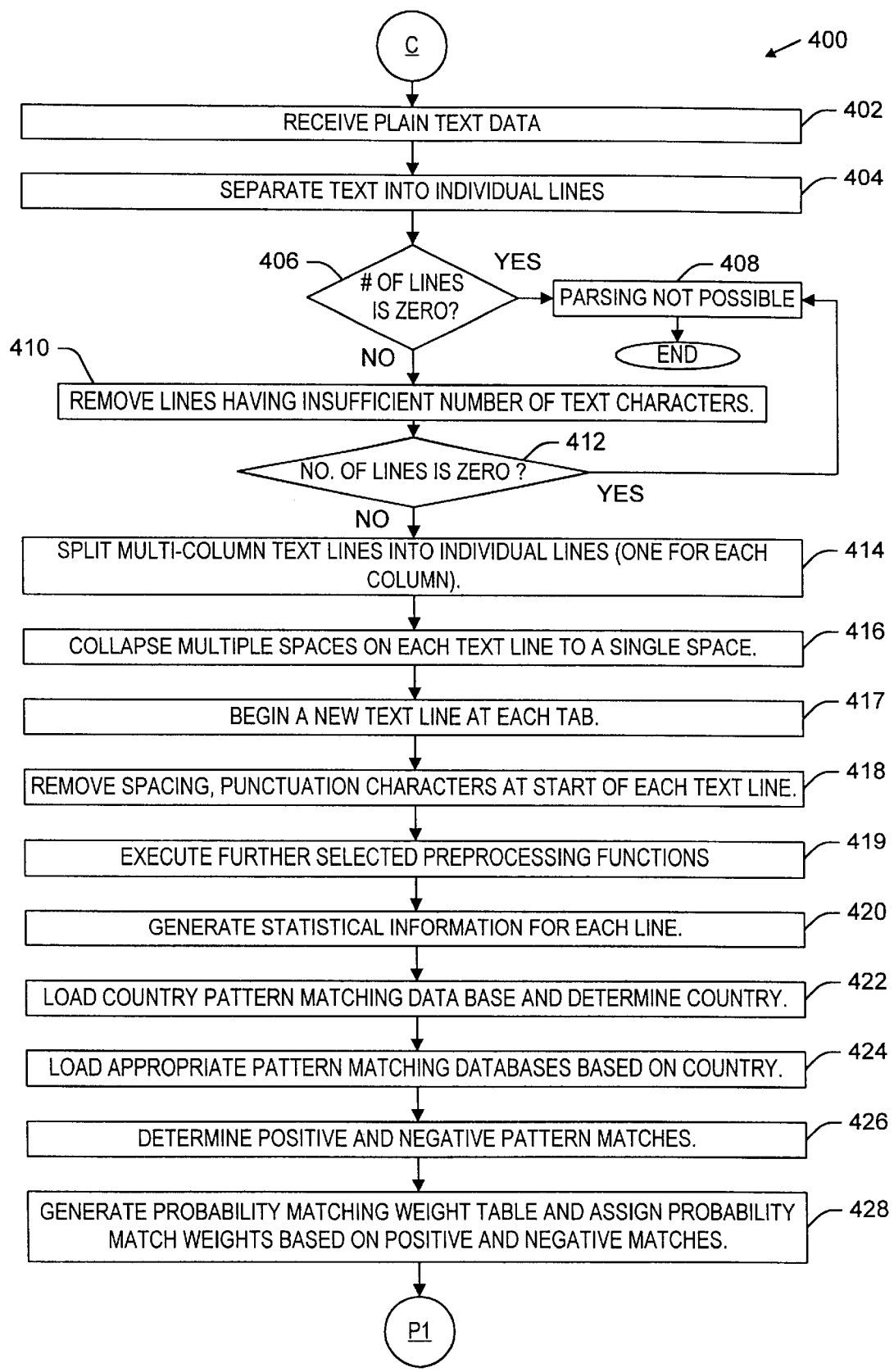
FIGS. 11A through 11C are flow diagrams illustrating the address data parsing sub-process of the data exchange process of FIGS. 6 and 7.

FIG. 11A shows a flow diagram at 400 illustrating an address data parsing process in accordance with the present invention. The process 400 proceeds from "C" (from FIG. 7) and proceeds to step 402 in which the parsing module 106 (FIG. 3) receives the plain text data which has been extracted from the source host in step 234 (FIG. 7) of the data exchange process. As described above, the address data parsing process 400 is called by the data exchange process if it is determined at 236 (FIG. 7) that the data block extracted from the source host is plain text data which must be parsed. From step 402, the depicted process proceeds to step 404 in which the parsing module separates the plain text data into individual text lines. From step 404, the process proceeds to 406 at which it is determined whether the number of individual lines of plain text data is equal to zero, and if so, the process proceeds to step 408 in which the parsing module indicates to the control logic module 100 (FIG. 3) that it is not possible to parse the plain text data, after which the depicted process ends. If the number of lines of plain text data is not equal to zero, the process proceeds from 406 to step 410 in which the parsing module removes those lines of the plain text data which do not include a predetermined threshold number of text characters.

From step 410, the process proceeds to 412 at which it is determined whether the remaining number of lines of plain text data (the number of lines remaining after those lines having an insufficient number of text characters have been removed in step 410) is equal to zero. If so, the process proceeds to step 408 in which the parsing module indicates that it is not possible to parse the plain text data, after which the data exchange process ends. If the remaining number of lines of plain text data is not equal to zero, the process proceeds from 412 to step 414 in which the parsing module splits each multi-column line of the plain text data, that is each text line which has multiple columns, into individual text lines, one line for each column. In step 416, the parsing module collapses any multiple successive spaces on each of the text lines into single spaces. In step 417, a new text line is begun for each tab found in each text line of the plain text data.

In step 418, the parsing module removes any spacing and punctuation type characters located at the start of each text line. In step 419, the parsing module executes further preprocessing functions on the plain text data extracted from the source host. In varying embodiments of the present invention, different additional pre-processing functions are performed on the plain text data. In one embodiment, the further pre-processing functions may be selected by the user from a menu including options for: beginning a new text line for each period followed by two spaces in a text line; and beginning a new text line for each "|" symbol found in a text line. Steps 402–419, as described above, comprise a pre-processing stage of the address parsing process.

In step 420, the parsing module generates statistical information for each of the text lines. The statistical information includes a number of words in each text line, a count of alphabetic and numeric characters in each text line, a count of numbers in each text line, a count of capitalized words in each text line, a count of upper case and lower case characters in each text line, a longest word length in each text line, a count of spaces in each text line, and a count of punctuation marks (e.g., period, comma, question mark, semicolon, etc.) in each text line.

In step 422, the parsing module: loads the country name pattern matching database 375 (FIG. 10B); reads the plain text data; and compares text strings of the plain text data to entries in the country name pattern matching database to determine if a country pattern match exists for the plain text data. If no country match is determined, the parsing module assumes that the plain text data includes an address of a particular country (e.g., a United States address). In step 424, based on the country determined in step 422, the parsing module loads an appropriate set of pattern matching data bases 372–398 (FIG. 10B) into the working memory unit of the client computer system.

In step 426, the parsing module determines positive and negative matches for the plain text data by determining all text strings of the plain text data which match an entry of any one of the pattern matching databases 372, 374, 376, 378, 380, 382, 384, 386 (FIG. 10B). In step 428, the parsing module generates a matching probability table 350 (FIG. 10A) in the memory unit 37 (FIG. 2) of the client computer system wherein the probability weights stored in the probability weight columns 358 (FIG. 10A) in the table are initialized based on the positive and negative matches determined for the plain text data in step 426. From step 428, the process proceeds to "P1" (to FIG. 11B).

Figure 11B:
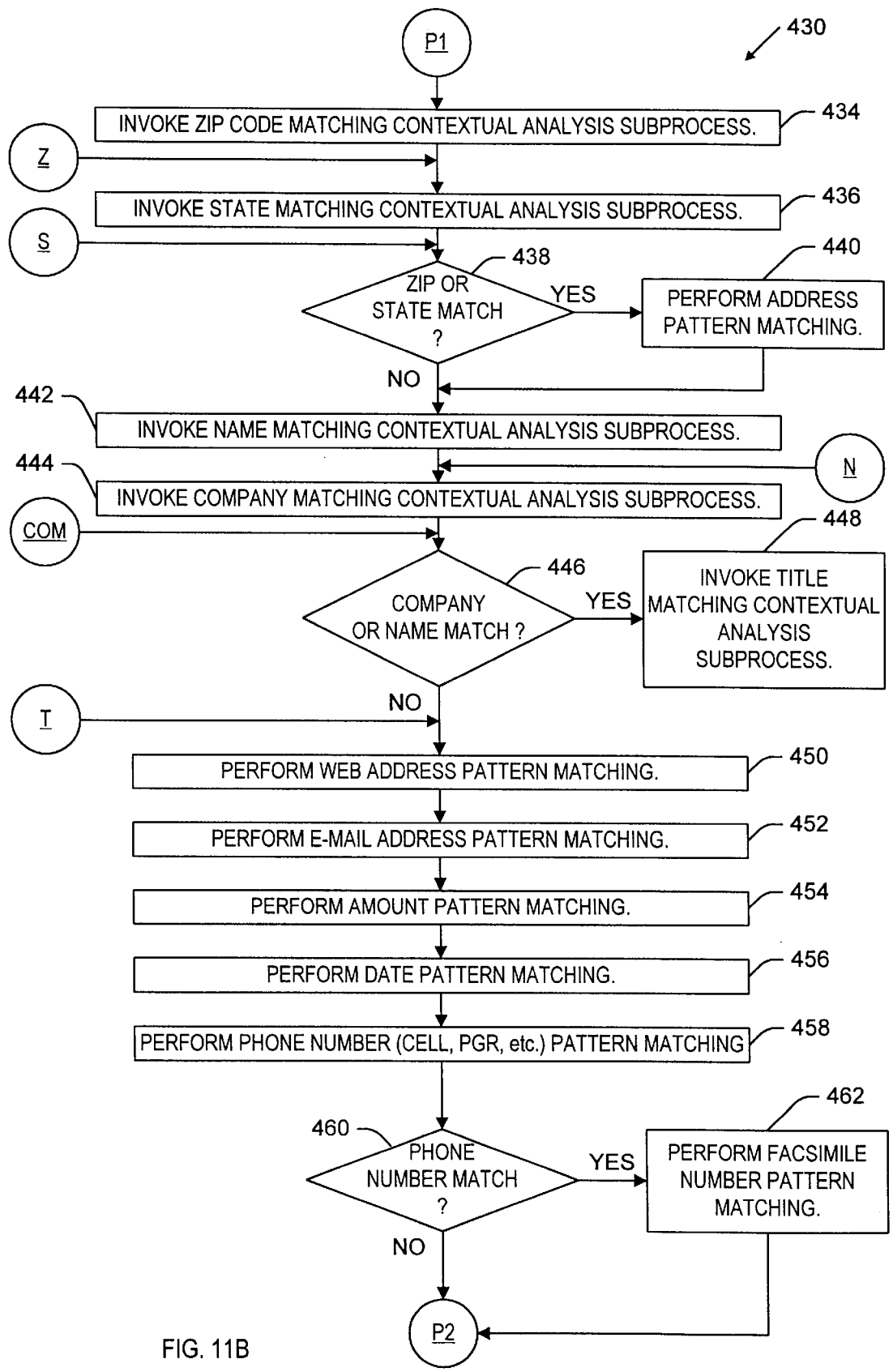

FIG. 11B shows a flow diagram at 430 illustrating further steps of the address data parsing process 400 of FIG. 11A. The depicted process proceeds from "P1" (from FIG. 11A) and proceeds to step 434 in which the parsing module invokes a zip code-matching contextual analysis sub-process, as further explained below, to determine whether the plain text data includes a zip code match, that is a text string having a high probability of representing a zip code. If a zip code match is found, a zip code tag is associated with the corresponding text string to designate it as a zip code match.

In step 436, the parsing module invokes a state-matching contextual analysis sub-process, as further explained below, to determine whether the plain text data includes a state match, that is a text string having a high probability of representing a state. If a state match is found, a state tag is associated with the text string designating it as a state match. Note that while the depicted process invokes the zip code matching contextual analysis sub-process before the state matching contextual analysis sub-process, the order in which these sub-processes are invoked may be reversed in accordance with the present invention.

It is then determined at 438 whether a zip code match or a state match has been determined, and if so, the process proceeds to step 440 in which the parsing module invokes an address-matching contextual analysis sub-process, as further explained below, to determine whether the plain text data includes an address match which is a text string having a high probability of representing a "street address". If an address match is found, an address tag is associated with the corresponding text string indicating that it constitutes an address match. From step 440, the process proceeds to step 442.

If neither zip code match nor a state match has been determined, the process proceeds from 438 directly to step 442 in which the parsing module invokes a name-matching contextual analysis sub-process, as further explained below, to determine whether the plain text data includes a name match. In step 444, the parsing module invokes a company name matching contextual analysis sub-process, as further explained below, to determine whether the plain text data includes a company match.

It is then determined at 446 whether a company match or a name match has been determined in steps 442 and 444. If a company match or a name match has been found, the process proceeds from 446 to step 448 in which a title matching contextual analysis sub-process, as further explained below, is invoked to determine whether the plain text data includes a text string constituting a title match. If neither a company match nor a name match has been determined, the process proceeds from step 446 directly to step 450 in which the parsing module invokes a web address pattern matching sub-process, as further explained below, which determines whether the plain text data includes a web address match, and if so, a web address tag is associated with the corresponding text string designating it as such.

In step 452, the parsing module performs pattern matching using the e-mail address matching data base 388 (FIG. 10B) to determine if the plain text data includes an e-mail match. In step 454, the parsing module performs matching using the amount pattern matching data base 396 (FIG. 10B) to determine whether the plain text data includes a text string having a high probability of representing an amount. If a text string constituting an amount match is found, an amount tag is associated with the corresponding text string.

In step 456, the parsing module performs pattern matching using the date pattern matching data base 398 (FIG. 10B) to determine whether the plain text data includes a date match which is a text string having a high probability of representing a date (e.g., Jan. 1, 1999). If a date match is found, a date tag is associated with the corresponding text string.

In step 458, the parsing module performs phone number pattern matching using the phone number pattern matching data base 390 (FIG. 10B) to determine whether the plain text data includes a phone number match which is a text string having a high probability of being a phone number, such as a cell phone number, a pager number, etc. If a phone number match is found, a phone number tag is used to designate the corresponding text string as a phone number.

At 460, the parsing module determines whether a phone number match has been determined in accordance with step 458, and if so, the process proceeds to step 462 in which the parsing module performs facsimile number pattern matching using the data base 392 (FIG. 10B) to determine whether the plain text data includes a facsimile number match which is a text string having a high probability of being a facsimile number. From step 462, the process proceeds to "P2" (to FIG. 11C). If a phone number match has not been determined, the process proceeds from 460 directly to "P2" (to FIG. 11C).

Figure 11C:
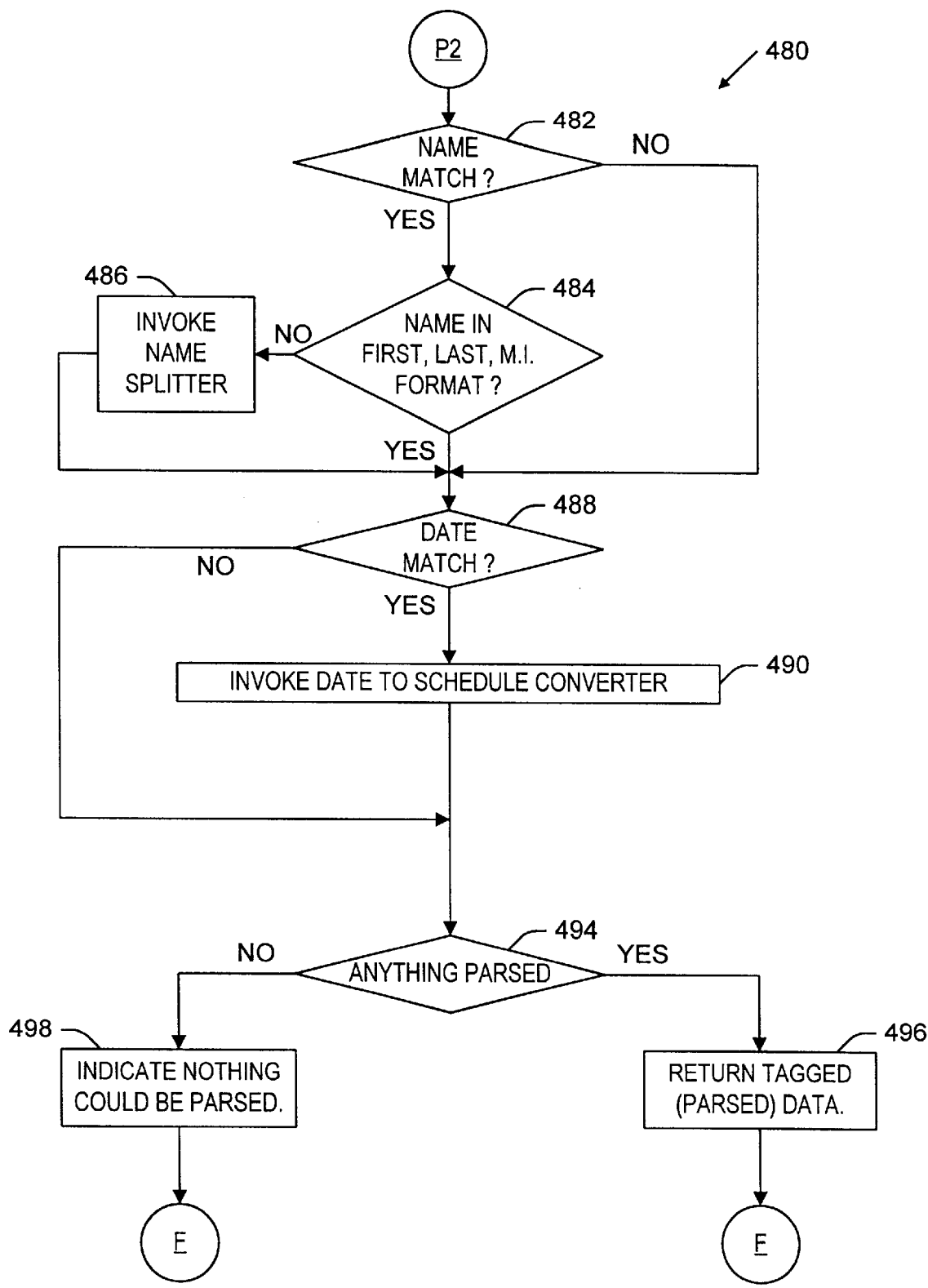

FIG. 11C shows a flow diagram at 480 illustrating further steps of the address data parsing process 400 (FIG. 11A). The depicted process proceeds from "P2" (from FIG. 11B), and proceeds to 482 at which the parsing module determines whether a name match has been determined in accordance with the name contextual analysis sub-process invoked in step 442 (FIG. 11B), and if so, the process proceeds to 484. At 484, the parsing module determines whether the name match, that is the text string associated with the name tag, is in a first name-last name-middle initial type format. If the name match is not in a first name-last name-middle initial format, the process proceeds from 484 to step 486 in which the parsing module invokes a name spitting sub-process. As an example, the name "John F. Kennedy, Jr." would be split as follows: "first name: John; middle initial: F, last name: Kennedy, Jr." As another example, the name "Kennedy, John F." would be split as follows: "first name: John; middle initial: F, last name: Kennedy." As a further example, the name "Christina Moranis Aguilar" would be split as follows: "first name: Christina Moranis; last name: Aguilar." If the name is in a first name-last name-middle initial format, the process proceeds to 488.

If it is determined at 482 that no name match has been determined, the process proceeds directly from 482 to 488 at which it is determined whether a date match has been found in accordance with step 456. If a date match has been found, the process proceeds from 488 to step 490 in which the parsing module invokes a date-to-schedule converting sub-process. Formats searched for in this sub-process include: "<date or time> to <date or time>", "<date or time><date or time>", and "From: <date or time> To: <date or time>" (can be on three separate lines). Another example of a format searched for in this sub-process includes, "<time>tomorrow [time of the day]", an example of which is "let us meet at 3 pm on thursday". Further examples of formats searched for include: "on <somebodys> <duration> <time> <date> birthday/wedding/anniversary/ . . . "; on <holiday> (e.g., on thanksgiving); "on [number] [of] day(s) before/after holidays (e.g., two days after thanksgiving); "sometime next <weekday/month/year> (e.g., let us meet sometime next Friday).

If no date match has been found, the process proceeds from 488 to 494 at which the parsing module determines whether any text strings of the plain text data have been parsed and tagged, and if so, the process proceeds to step 496 in which the parsing module returns the parsed and tagged data to the control logic module 100 (FIG. 3) after which the process proceeds to "F" (to FIG. 7). If it is determined at 494 that none of the plain text data has been parsed and tagged the process proceeds to step 498 in which the parsing module indicates via the display device 42 (FIG. 2) that the data could not be parsed, after which the process proceeds to "F" (to FIG. 7).

Figure 12A:
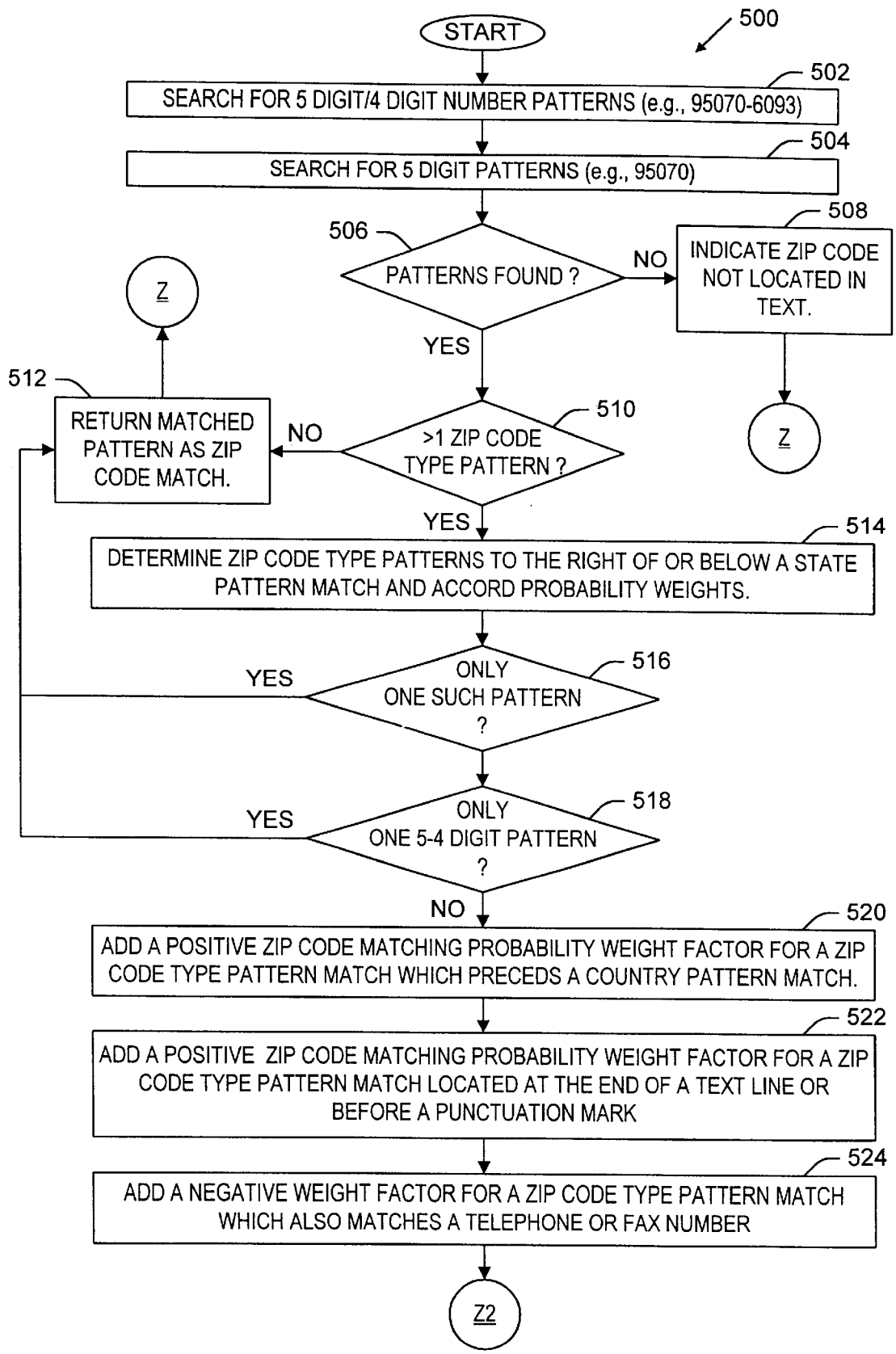
FIGS. 12A and 12B are flow diagrams illustrating steps of a zip code matching contextual analysis stage of the address data parsing sub-process.

FIG. 12A shows a flow diagram at 500 illustrating the zip code matching contextual analysis sub-process invoked by the parsing module 106 (FIG. 3) in step 434 (FIG. 11B). In step 502, the parsing module searches the text lines of the plain text data for a five digit/four digit number pattern, or text string (e.g., 95070-6093). In step 504, the parsing module searches the text lines for a five digit pattern (e.g., 95070). It is then determined at 506 whether a zip code type pattern (a five digit/four digit pattern, or a five digit pattern) has been found, and if not, the sub-process proceeds to step 508 in which the parsing module indicates that a zip code could not be located in the plain text data, after which the sub-process proceeds back to "Z" (to FIG. 11B).

If it is determined at 506 that a zip code type pattern has been found, the sub-process proceeds to 510 at which it is determined whether more than one zip code type pattern has been identified. If not more than one zip code type pattern has been identified, the process proceeds from 510 to step 512 in which the zip code matching module returns the single zip code type pattern as a zip code match having a zip code tag associated therewith. From step 512 the process proceeds back to "Z" (to FIG. 11B) to continue the address data parsing process.

If it is determined at 510 that more than one of the zip code type patterns searched for in steps 502 and 504 has been identified, the process proceeds to step 514 in which it is determined whether any of the identified zip code type patterns is located to the right of or below a text string determined in step 426 (FIG. 11A) to be state pattern match, that is a text string matching an entry in the state name pattern matching database 380 (FIG. 10B). Also in step 514, the parsing module accords positive zip code matching weight factors for the identified zip code type patterns. These weight factors are added to cumulative zip code probability weights stored in the corresponding one of the columns 358 of the matching probability table 350 (FIG. 10). A zip code type pattern which is located to the right of a state pattern match is accorded a higher zip code matching weight factor than a zip code type pattern located below a state pattern match.

It is then determined at 516 whether there is only one particular zip code type pattern which is located to the right of or below a state pattern match, and if so, the process proceeds to step 512 in which the particular zip code type pattern is returned as the zip code match, after which the process proceeds to "Z" (to FIG. 11B). Alternatively, the process proceeds from 510 to 518 at which it is determined whether there is only one five digit/four digit zip code type pattern, and if so, the process proceeds to step 512 in which the zip code matching module returns the five digit/four digit pattern as the zip code match, as described above.

In step 520, the parsing module adds a positive zip code matching weight factor for a zip code type pattern which is located before a country pattern match. In step 522, a zip code type pattern, which is located at the end of the corresponding line or before a punctuation mark, is according positive zip code matching weight factor. In step 524, a zip code type pattern which also matches a telephone number or facsimile number is accorded a negative zip code matching weight factor. From step 524, the process proceeds to "Z2" (to FIG. 12B).

Figure 12B:
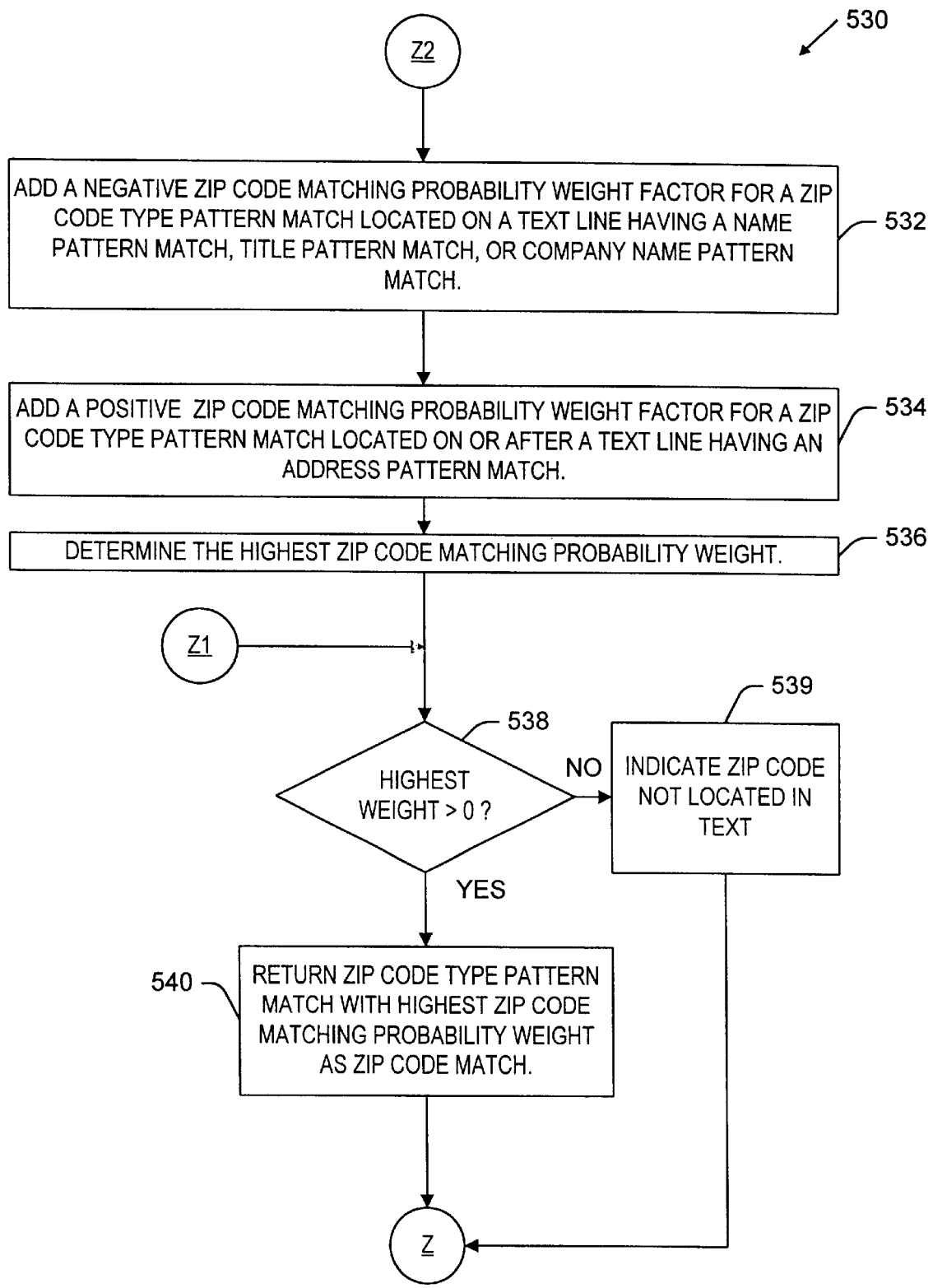

FIG. 12B shows a flow diagram at 530 illustrating further steps of the zip code matching sub-process 500 (FIG. 12A). The depicted sub-process proceeds from "Z2" (from FIG. 12A) to step 532 in which the parsing module accords a negative zip code matching weight factor to a zip code type pattern which is determined to be located on a text line having a name pattern match, a title pattern match, or a company pattern match. From step 532, the process proceeds to step 534 in which a zip code type pattern is accorded a positive zip code matching weight factor if it is located on a text line following an address pattern match, or on a text line having an address pattern match. In step 536, the zip code type pattern match with the highest zip code weight is assumed to be the zip code match.

It is then determined at 538 whether the highest zip code weight is greater than zero, and if so, the sub-process proceeds back to step 540 in which the zip code type pattern match having the highest zip code matching weight associated therewith is returned as the zip code match, after which the process proceeds to "Z" (to FIG. 11B). If the highest zip code matching weight is not greater than zero, the process proceeds from 538 to step 539 in which the parsing module indicates that no zip code match has been found.

Figure 13A:
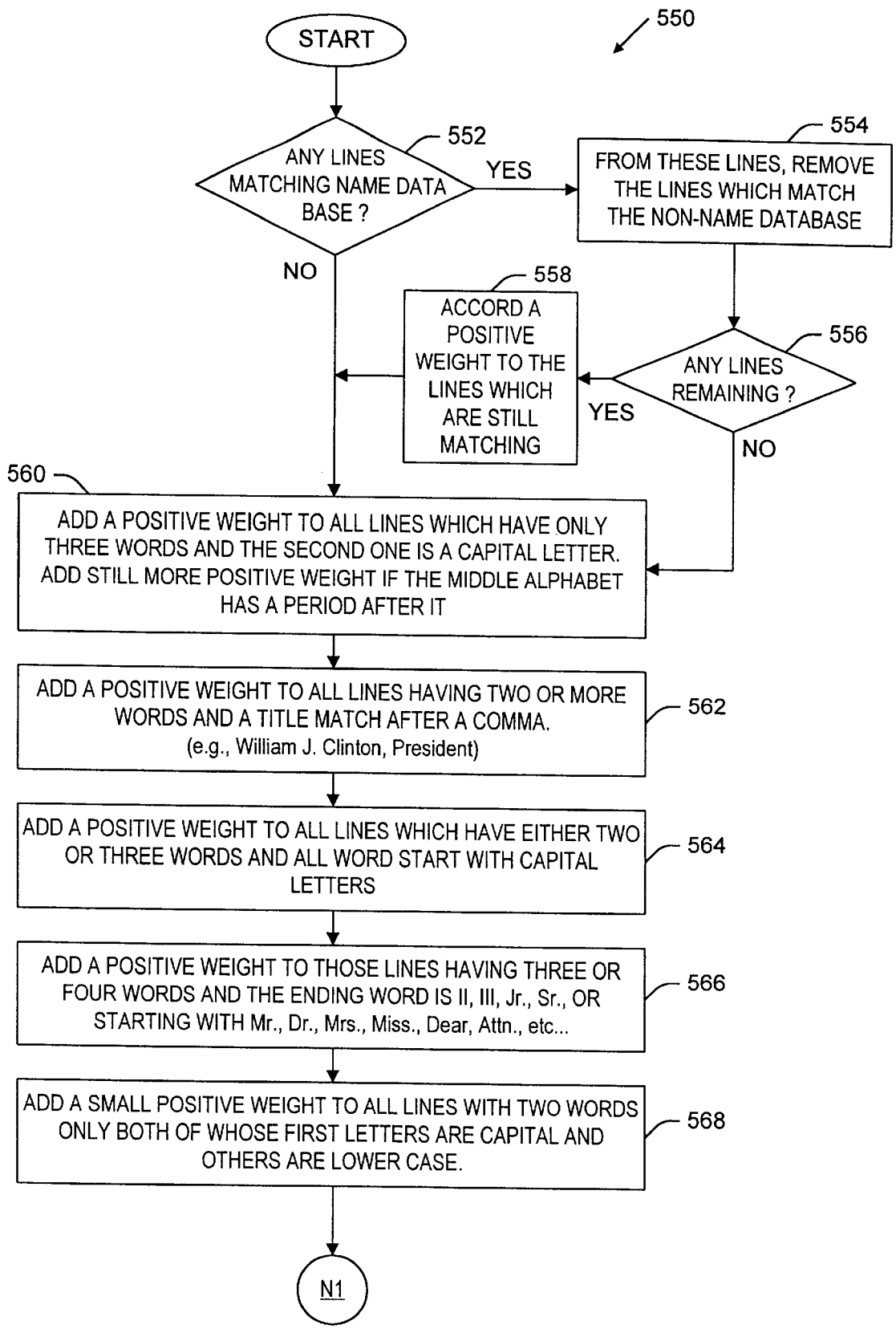
FIGS. 13A and 13B are flow diagrams illustrating a name matching contextual analysis stage. of the address data parsing sub-process of FIGS. 12A and 12B.

FIG. 13A shows a flow diagram at 550 depicting the name matching contextual analysis sub-process invoked by the parsing module in step 442 (FIG. 11B). The depicted sub-process begins at 552 in which the parsing module determines whether a positive name pattern match, that is a text string matching a name entry in the positive name matching database 374 (FIG. 10B), has been identified in step 426 (FIG. 11A). If the plain text data includes a positive name pattern match, the process proceeds from 552 to step 554 in which the parsing module removes negative name pattern matches, that is text strings which match entries in the negative name matching database 372 (FIG. 10B), from the text lines including positive name pattern matches.

From step 554, the process proceeds to 556 at which the parsing module determines whether any text lines having positive name pattern matches are remaining after the text strings constituting negative name pattern matches have been removed in step 554. If so, the process proceeds to step 558 in which the parsing module accords a positive name matching probability weight factor for these text lines. If no such text lines remain, the process proceeds from 556 to step 560 in which the parsing module accords a positive name matching probability weight factor to all text lines which have only three words wherein the second word includes only one capital alphabetic character. Further in accordance with step 560, the parsing module accords an additional positive name matching probability weight to the text line if the single alphabetic character has a period located after it.

In step 562, the parsing module accords a positive name matching probability weight to all text lines having two or more words, and a title pattern match located after a comma (e.g., William J. Clinton, President). In step 564, the parsing module accords a positive name matching probability weight to all text lines which have either two or three words, and wherein all words begin with capital letters. In step 566, the parsing module accords a positive name matching probability weight to those text lines having three or four words, wherein the ending word is "II", "III", "Jr.", "Sr.", or wherein the text line begins with "Mr.", "Dr.", "Mrs.", "Miss", "Dear", "Attention", etc.

In step 568, the parsing module adds a small positive name matching probability weight to all text lines having two words only, wherein the first letter of both words is a capital letter, and wherein the other letters are lower case. Positive weights are added to names which begin with "Mc[Capital letter] [lowercase letter]", "Mac[Capital letter] [lowercase letter]", "[Capital letter][apostrophe][Capital letter][lowercase letter]", or name which have the form, "[Capital letter][lowercase letter]<hyphen>[Capital letter] [lowercase letter]". From step 568, the process proceeds to "N1" (to FIG. 13B).

Figure 13B:
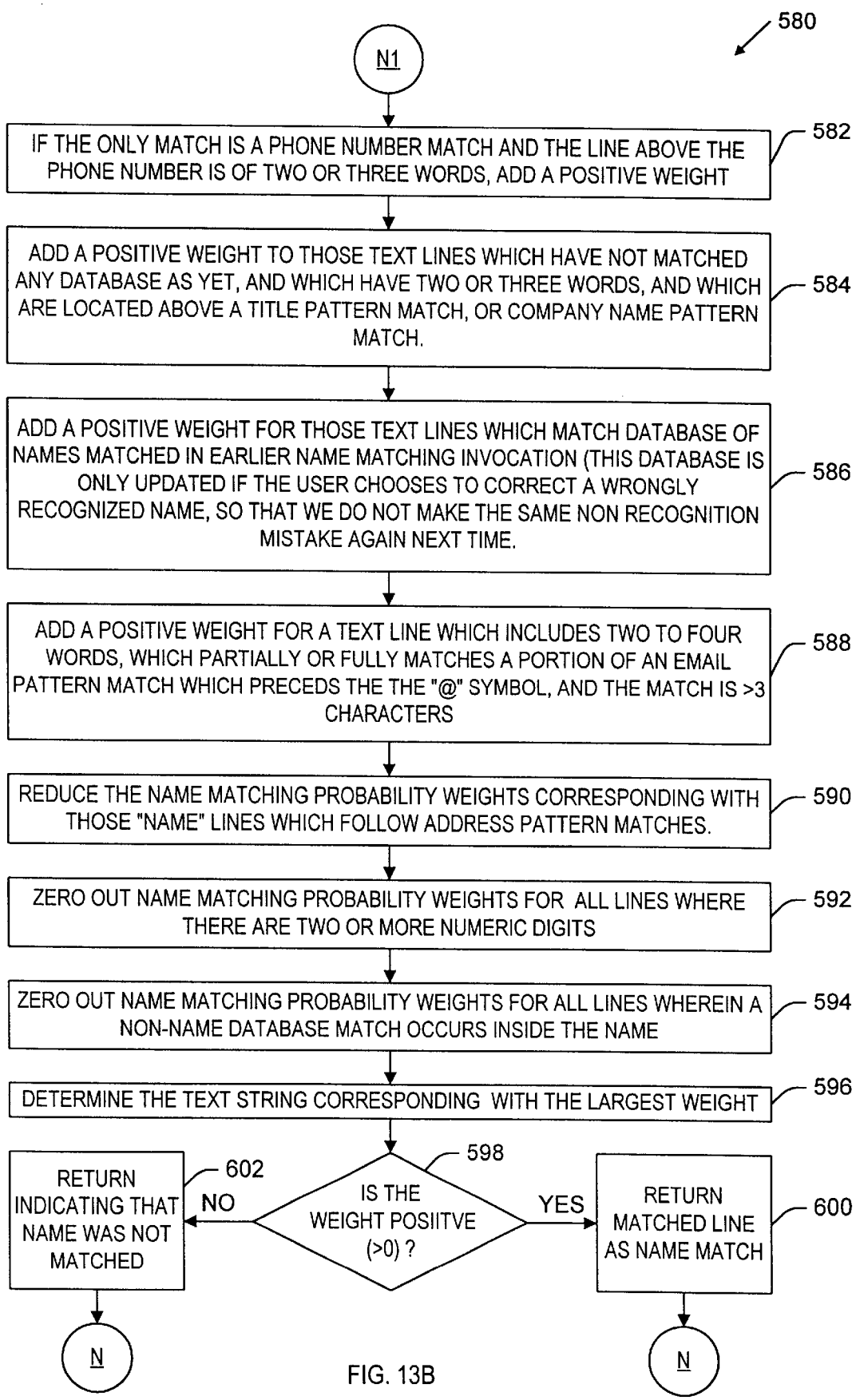

FIG. 13B shows a flow diagram at 580 depicting further steps of the name matching contextual analysis sub-process 550 (FIG. 13A). The depicted process proceeds from "N1" (from FIG. 13A), and proceeds to step 582 in which the parsing module accords a positive name matching weight to a text line if the only pattern match determined for the line, in step 426 (FIG. 11A), is a phone number pattern match and the line above the phone number includes two or three words.

In step 584, the parsing module accords a positive name matching probability weight to those text lines which do not include a pattern match, and which include two or three words, and which are located above a text line including a title pattern match or a company pattern match as determined in step 426 (FIG. 11A). In step 586, the parsing module adds a positive name matching probability weight for those text lines which match an entry in the positive name database. Note that this database is updated if the user chooses to correct a wrongly recognized name, so that the same mistake is not made again.

In step 588, the parsing module accords a positive name matching probability weight to all text lines having two to four words, and which partially or fully match the portion of an email pattern match before the @ symbol, and wherein the match is greater than three characters. For example, if an e-mail address, "jsmith@ACME.com", is detected, then the parsing module attempts to match strings with the patterns "jsmith" and "smith". If a string matches this pattern, there is a high probability that the string is a name because personal e-mail addresses often include the company name.

In step 590, the parsing module reduces the name matching probability weight associated with those text lines which are located after an address pattern match. In step 592, the parsing module zeros out the name matching probability weights associated with all text strings including two or more numeric digits. In step 594, the parsing module zeros out the name matching probability weights associated with all text strings for which a non-name database pattern match occurs in the text string. In step 596, the parsing module determines the text string having the largest name matching probability weight.

It is then determined at 598 whether the largest name matching probability weight is greater than zero, and if so, the process proceeds to step 600 in which the text string associated with the largest name matching probability weight is returned as the name match, after which the process proceeds to "N" (to FIG. 11B).

Figure 14:
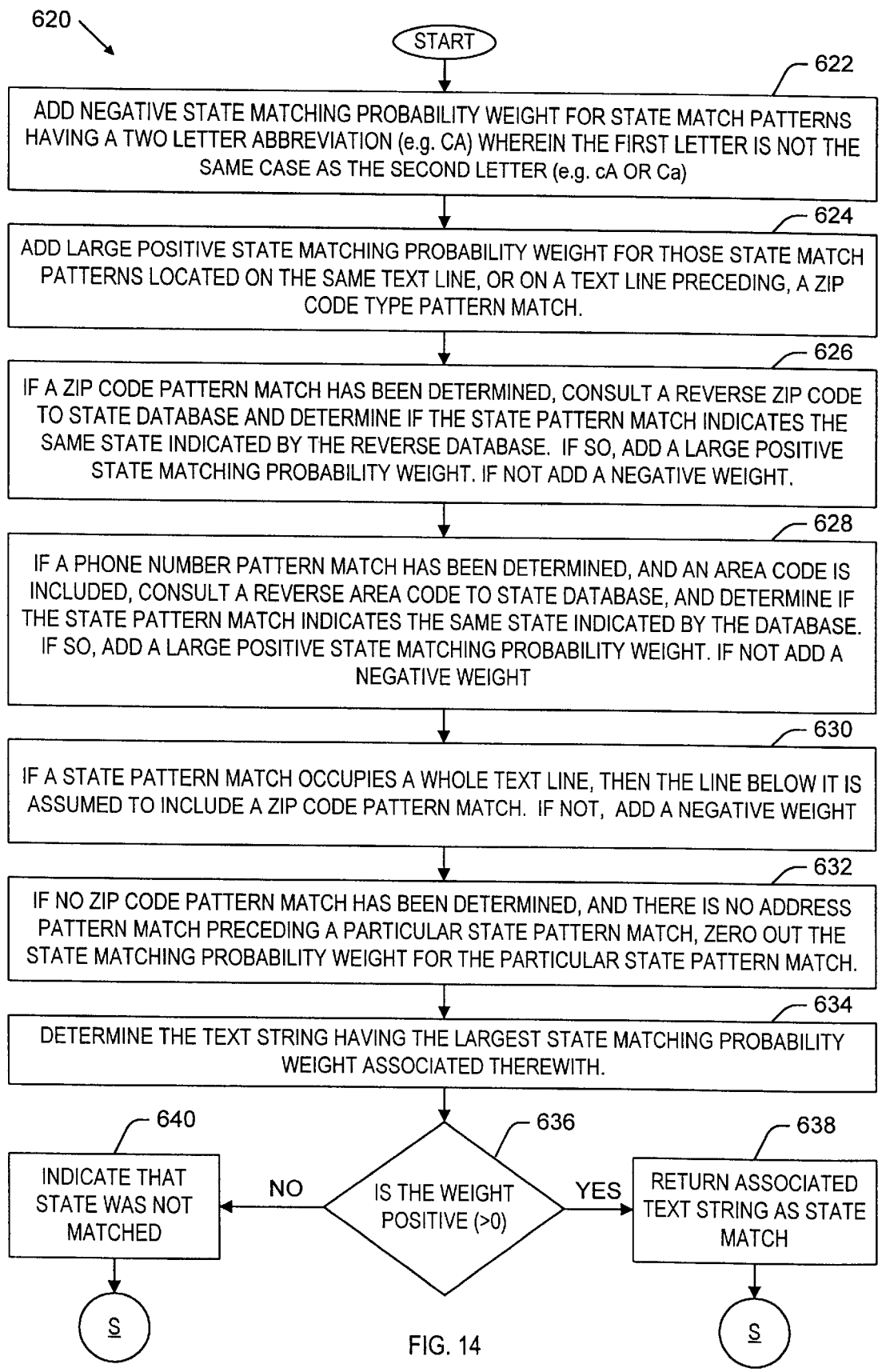
FIG. 14 is a flow diagram illustrating a state name matching contextual analysis stage of the address data parsing sub-process.

FIG. 14 shows a flow diagram at 620 illustrating the state name contextual analysis sub-process invoked by the parsing module in step 436 (FIG. 11B) of the address data parsing process. In step 622, the parsing module adds a negative state name matching probability weight for all state pattern matches, determined in step 426 (FIG. 11A), having a two letter abbreviation (e.g., CA) wherein the first letter is not the same case as the second letter (e.g., cA or Ca). In step 624, the parsing module adds a large positive state name matching probability weight for those state pattern matches located on the same text line as a zip code type pattern match, or on a text line preceding a zip code type pattern match. In step 626, the parsing module determines if a zip code pattern match has been determined in step 426 (FIG. 11A), and if so, the parsing module consults a reverse zip code to state data base. This reverse data base is used to determine if a state pattern match indicates the same state which is indicated by an entry in the reverse data base corresponding with the zip code pattern match, and if so, the parsing module adds a large positive weight for the state pattern match. If not, the parsing module adds a negative weight for the state pattern match.

In step 628, the parsing module determines whether a phone number pattern has been determined in step 426 (FIG. 11A) and whether an area code is included in the phone number pattern. If a phone number pattern having an area code is found, the parsing module consults a reverse area code to state data base, and determines if a state pattern match indicates the same state indicated by an entry in the reverse data base corresponding with the area code. If so, the parsing module adds a large positive state matching probability weight. If not, the parsing module adds a negative weight for the state pattern match.

In step 630, the parsing module determines if a particular state pattern match occupies a whole text line, and if so, the parsing module determines whether the text line following the particular state pattern match includes a zip code pattern match. If the text line following the particular state pattern match does not include a zip code pattern match, the parsing module adds a negative probability weight for the particular state pattern match.

In step 632, the parsing module determines whether a zip code pattern match has been determined in step 426 (FIG. 11A), and also determines whether there is no address pattern match preceding a state pattern match. If so, the parsing module renders the state matching probability weights associated with all state pattern matches equal to zero. This step prevents text strings including words such as "or" being matched with a state such as "Oregon", and also prevents text strings including company names which have state names in them (e.g., Texas Instruments) from being mistaken for state matches.

In step 634, the parsing module determines the text string having the largest state matching probability weight associated therewith. From step 634, the process proceeds to step 636 at which it is determined whether the largest state matching probability weight is greater than zero, and if so, the process proceeds to step 638 in which the parsing module returns the text string having the largest state matching probability weight associated therewith as the state match. From step 638, the process proceeds to "S" (back to FIG. 11B).

If it is determined at 636 that the largest state matching probability weight is not greater than zero, the process proceeds to step 640 in which the parsing module indicates that no state match has been determined, after which the process proceeds to "S" (back to FIG. 11B).

Figure 15:
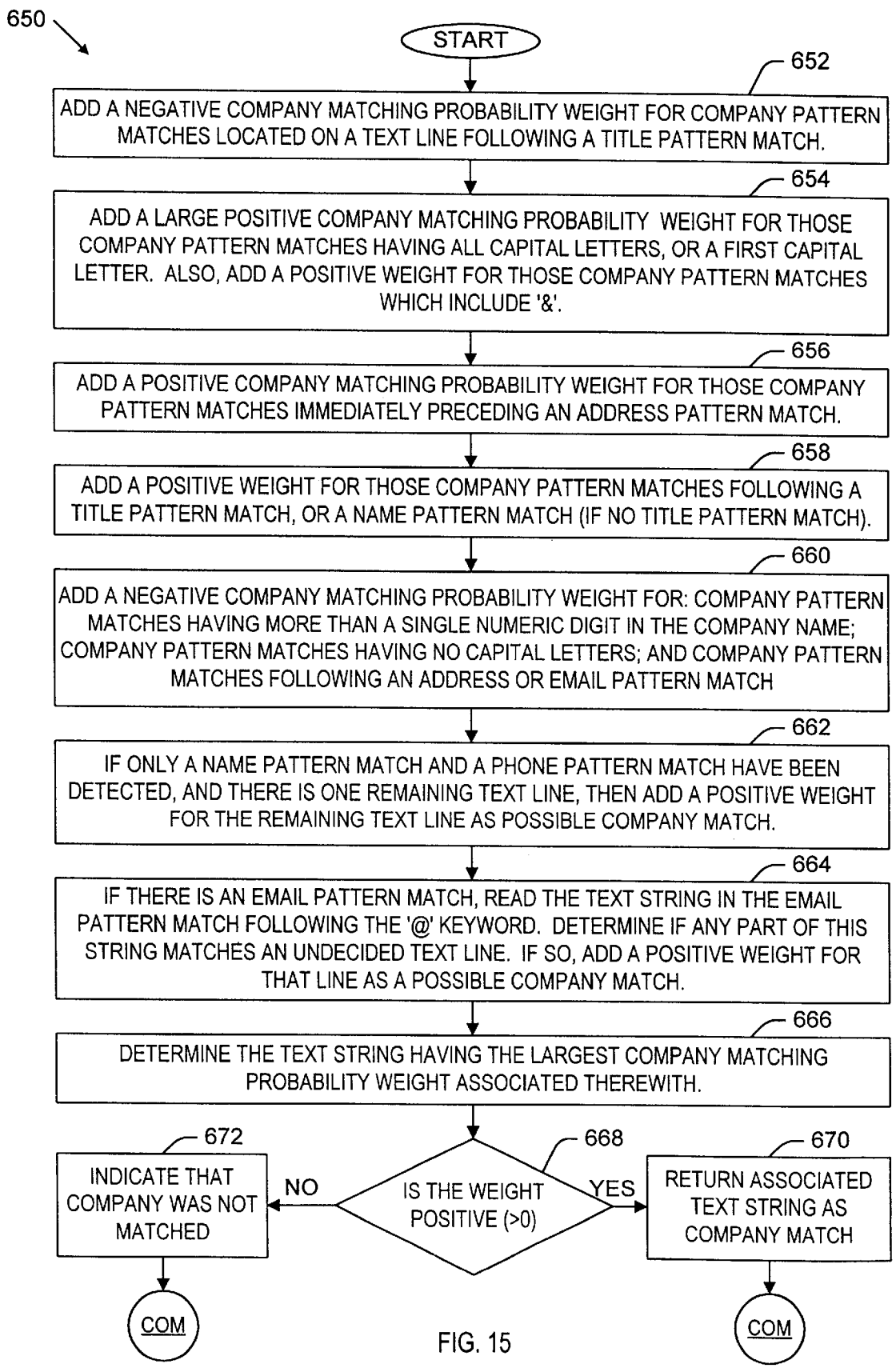
FIG. 15 is a flow diagram illustrating a company name matching contextual analysis stage of the address data parsing sub-process.

FIG. 15 shows a flow diagram at 650 illustrating the company name contextual analysis sub-process invoked by the parsing module in step 444 (FIG. 11B) of the address data parsing process. In step 652, the parsing module adds a negative company matching probability weight for those company pattern matches, determined in step 426 (FIG. 11A), located on a text line following a title pattern match. In step 654, the parsing module adds a large positive company matching probability weight for those company pattern matches having all capital letters, or a first capital letter. Also in step 654, the parsing module adds a positive weight for those company pattern matches which include the symbol, "&".

In step 656, the parsing module adds a positive weight for those company pattern matches immediately preceding an address pattern match. In step 658, the parsing module adds a positive weight for those company pattern matches following a title pattern match, or a name pattern match (if no title pattern match has been determined). In step 660, the parsing module adds a negative company matching probability weight for company pattern matches having more than a single numeric digit in the company name; the company pattern matches having no capital letters; company pattern matches following an address or e-mail pattern match. In step 662, the parsing module determines whether only a name pattern match and a phone pattern match have been detected, and whether there is one remaining text line. If these conditions are true, then the parsing module adds a positive weight for the remaining text line as a company match.

In step 664, the parsing module determines whether there is an e-mail address pattern match, and if so, the parsing module reads the text string in the e-mail pattern match which follows the symbol, "@". Further in step 664, the parsing module determines if any part of this text string matches an undecided text line, and if so, the parsing module adds a positive weight for that text string as a possible company match.

In step 666, the parsing module determines the text string having the largest company match probability weight associated with it. From step 666, the process proceeds to step 668 at which it is determined whether the largest company match probability weight is greater than zero, and if so, the process proceeds to step 670 at which the parsing module returns the text string associated with the largest company match probability weight as the company match. From step 670 the process proceeds to "COM" (back to FIG. 11B). If the largest company match probability weight is not greater than zero, the process proceeds from 668 to step 672 in which the parsing module indicates that no company match was found. From step 672, the process proceeds to "COM" (back to FIG. 11B).

Figure 16:
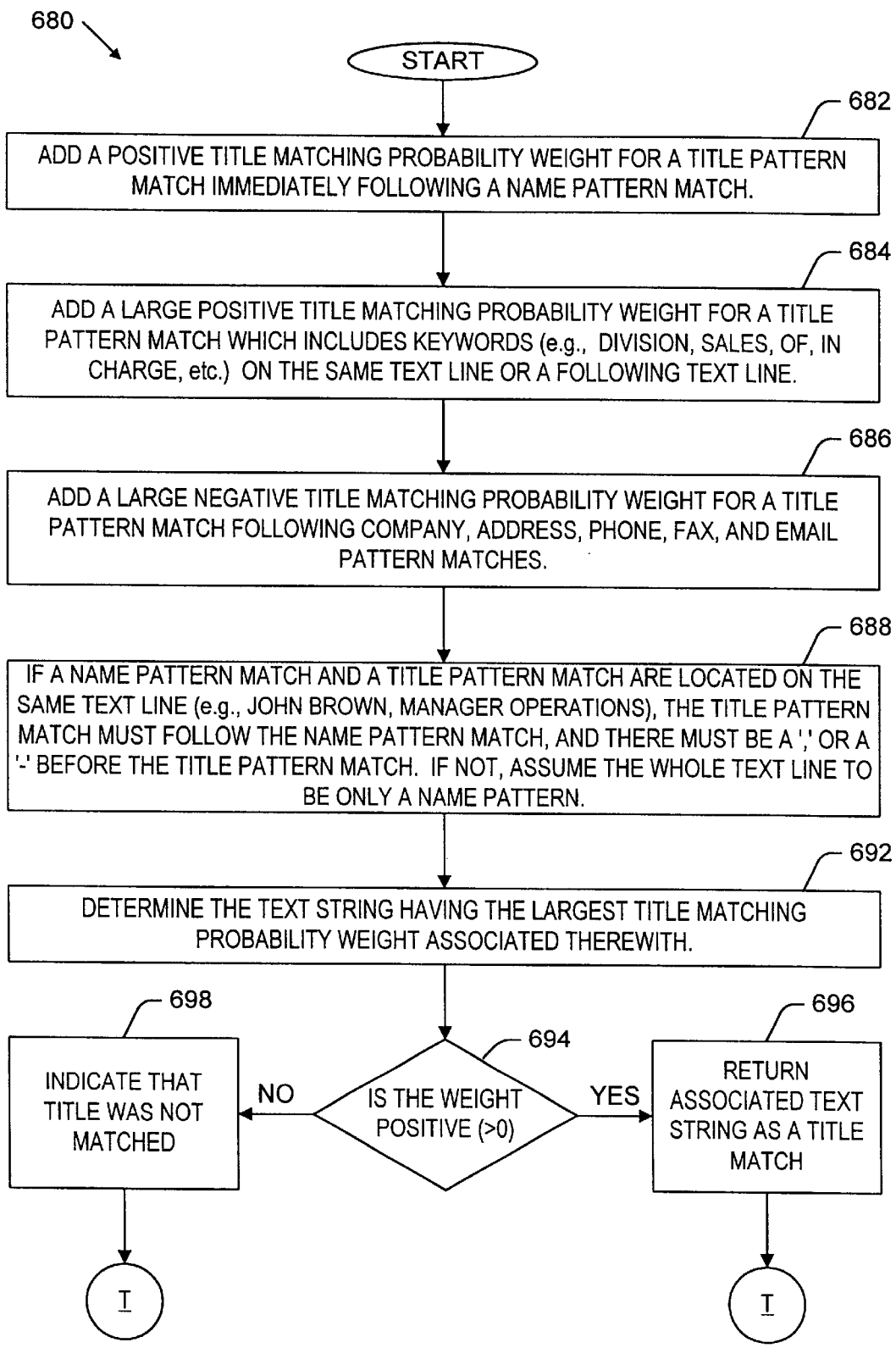
FIG. 16 is a flow diagram illustrating a title matching contextual analysis stage of the address data parsing sub-process.

FIG. 16 shows a flow diagram at 680 illustrating the title matching contextual analysis sub-process invoked by the parsing module in step 448 (FIG. 11B). The process begins with step 682 in which the parsing module adds a positive title matching probability weight for a title pattern match immediately following a name pattern match, wherein a title pattern match has been determined in step 426 (FIG. 11A).

In step 684, the parsing module adds a large positive title matching probability weight for a title pattern match which includes predetermined keywords (e.g., division, sales, of, in charge, etc.) on the same text line or on a following text line. In step 686, the parsing module adds a large positive weight for a title pattern match following a company pattern match, an address pattern match, a phone pattern match, a facsimile number pattern match, or an e-mail address pattern match.

In step 688, the parsing module determines if a name pattern match and a title pattern match are located on the same text line (e.g., John Brown, manager operations). The title pattern match must follow the name pattern match, and there must be a ",", or a "-" before the title pattern match. If not, the parsing module assumes the whole text line to be only a name pattern match.

In step 692, the parsing module determines the text string having the largest title matching probability weight associated therewith. From step 692, the process proceeds to 694 at which it is determined whether the largest title matching probability weight is greater than zero, and if so, the process proceeds to step 696 at which the parsing module returns the text having the largest title matching probability weight associated therewith as the title match. From step 696, the process proceeds to "T" (to FIG. 11B).

If the largest title match probability weight is not greater than zero, the process proceeds from 694 to step 698 in which the parsing module indicates that no title match has been found. From step 698, the process proceeds to "T" (to FIG. 11B).

In accordance with the described embodiment, the pattern matching steps and contextual analysis sub-processes are executed in the particular described order. However, it is not essential to the practice of the present invention that these steps and sub-processes be executed in the particular order described. In alternative embodiments, these steps and sub-processes may be executed in any other appropriate order.

In accordance with the present invention, the address data parsing and tagging process 400 (FIG. 11A) may be used to determine the identity of various fields of a "form" provided by the web server 21 (FIG. 1) to the client computer system via the network 16 (FIG. 1), as described above. In this manner, the data exchange process of the present invention may transfer data representing postal address information to the proper fields of a form.

Also in accordance with the present invention, the address data parsing and tagging process 400 (FIG. 11A) may be used to determine the type of information stored in various fields of a host for which a generic type of driver interface module 90 (FIG. 3) must be used. For example, data in a host may be parsed and tagged into fields but the fields may not have readily identifiable tags, and therefore the type of information stored in each field must be determined. The fields of a data host may include any combination of a name field, a title field, a company field, a "street address" field, a city field, a state field, a zip code field, a telephone number field, a fax number field, an e-mail address field, and a web address field. The address data parsing and tagging process 400 (FIG. 11A) may be used to determine the type of information stored in each field so that automatic mapping can be implemented between fields of the source host and corresponding fields of the destination host.

Although the present invention has been particularly shown and described above with reference to a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A data exchange process for transferring a data block representing a geographical address from a source host using a source data format to a destination host using a destination data format, said process comprising the steps of:

using a first driver to extract said data block from the source host and to convert the format of said data block from the source data format to an intermediate data format;

temporarily storing said data block in an intermediate memory storage location;

determining if said data block includes plain text data which is not parsed and identified by corresponding tags;

if said data block includes plain text data which is not parsed and identified by corresponding tags, automatically parsing said data block into a plurality of data portions having corresponding tags associated therewith, each of said tags indicating a type of information represented by said corresponding data portion; and using a second driver to convert the format of said data block from said intermediate data format to the destination data format, and to insert said data block into the destination host.

2. A data exchange process as recited in claim 1 wherein said step of automatically parsing said data block into a plurality of data portions comprises the steps of:

identifying a plurality of text strings of the plain text data; and comparing said text strings to a plurality of predefined patterns to determine pattern matches between said text strings and said predefined patterns.

3. A data exchange process as recited in claim 2 wherein said step of comparing said text strings to a plurality of predefined patterns to determine pattern matches between said text strings and said predefined patterns further comprises the steps of:

comparing said text strings to a plurality of predefined country names;

determining a country name match between said text strings and said country names; and determining said predefined patterns based on said country name match.

4. A data exchange process as recited in claim 2 wherein said step of automatically parsing said data block into a plurality of data portions further comprises the steps of:

generating a plurality of probability weights for each of said text strings based on said pattern matches, each of said probability weights indicating a probability that said corresponding text string represents a corresponding type of information; and determining said data portions and said corresponding tags based on said probability weights.

5. A data exchange process as recited in claim 2 wherein said step of automatically parsing said data block into a plurality of data portions further comprises the steps of:

performing contextual analysis on said text strings;

generating a plurality of probability weights for each of said text strings based on said pattern matches and said contextual analysis, each of said probability weights indicating a probability that said corresponding text string represents a corresponding type of information; and determining said data portions and said corresponding tags based on said probability weights.

6. A data exchange process as recited in claim 5 wherein said step of performing contextual analysis on said text strings further comprises the step of determining positional relationships between various ones of said pattern matches.

7. A data exchange process as recited in claim 2 wherein said step of identifying said plurality of text strings comprises the steps of:

reading plain text data of said data block;

sorting said plain text data into a plurality of text lines;

determining spaces, tabs, and punctuation marks in said plain text data;

collapsing adjacent multiple ones of said spaces on each text line to a single space; and for each said tab, beginning a new text line and deleting said tab.

8. A data exchange process as recited in claim 7 wherein said step of identifying said plurality of text strings further comprises:

assigning a line number to each of said plurality of text lines; and assigning a starting position value and an ending position value to each of said text strings of each said text line of the plain text data.

9. A data exchange process as recited in claim 4 wherein said probability weights comprise:

country probability weights each indicating a probability that said corresponding text string represents a country name;

name probability weights each indicating a probability that said corresponding text string represents a persons name;

company name probability weights each indicating a probability that said corresponding text string represents a company name;

address probability weights each indicating a probability that said corresponding text string represents an address;

city name probability weights each indicating a probability that said corresponding text string represents a city name;

zip code probability weights each indicating a probability that said corresponding text string represents a zip code; and title probability weights each indicating a probability that said corresponding text string represents a title.

10. A data exchange process as recited in claim 9 wherein said probability weights further comprise telephone number probability weights each indicating a probability that said corresponding text string represents a telephone number.

11. A data exchange process as recited in claim 1 wherein the destination host is a form downloaded from a web-site.

12. A computer readable storage device having stored therein encoding instructions for executing a data exchange process for transferring data representing a geographical address from a source host using a source data format to a destination host using a destination data format, said process comprising the steps of:

using a first driver to extract said data block from the source host and to convert the format of said data block from the source data format to an intermediate data format;

temporarily storing said data block in an intermediate memory storage location;

determining if said data block includes plain text data which is not parsed and identified by corresponding tags;

if the data block includes plain text data which is not parsed and identified by corresponding tags, automatically parsing said data block into a plurality of data portions having corresponding tags associated therewith, each of said tags indicating a type of information represented by said corresponding data portion;

using a second driver to convert the format of said data block from said intermediate data format to the destination data format, and to insert said data block into the destination host.

13. A computer readable storage device as recited in claim 12 wherein said step of automatically parsing said data block into a plurality of data portions comprises the steps of:

identifying a plurality of text strings of the plain text data; and comparing said text strings to a plurality of predefined patterns to determine pattern matches between said text strings and said predefined patterns.

14. A computer readable storage device as recited in claim 13 wherein said step of comparing said text strings to a plurality of predefined patterns to determine pattern matches between said text strings and said predefined patterns further comprises the steps of:

comparing said text strings to a plurality of predefined country names;

determining a country name match between said text strings and said country names; and determining said predefined patterns based on said country name match.

15. A computer readable storage device as recited in claim 12 wherein said step of automatically parsing said data block into a plurality of data portions further comprises the steps of:

generating a plurality of probability weights for each of said text strings based on said pattern matches, each of said probability weights indicating a probability that said corresponding text string represents a corresponding type of information; and determining said data portions and said corresponding tags based on said probability weights.

16. A computer readable storage device as recited in claim 15 wherein said step of automatically parsing said data block into a plurality of data portions further comprises the steps of:

performing contextual analysis on said text strings;

generating a plurality of probability weights for each of said text strings based on said pattern matches and said contextual analysis, each of said probability weights indicating a probability that said corresponding text string represents a corresponding type of information; and determining said data portions and said corresponding tags based on said probability weights.

17. A computer readable storage device as recited in claim 16 wherein said step of performing contextual analysis on said text strings further comprises the step of determining positional relationships between various ones of said pattern matches.

18. A computer readable storage device as recited in claim 12 wherein said step of identifying said plurality of text strings comprises the steps of:

reading plain text data of said data block;

sorting said plain text data into a plurality of text lines;

determining spaces, tabs, and punctuation marks in said plain text data;

collapsing adjacent multiple ones of said spaces on each text line to a single space; and for each said tab, beginning a new text line and deleting said tab.

19. A computer readable storage device as recited in claim 18 wherein said step of identifying said plurality of text strings further comprises:

assigning a line number to each of said plurality of text lines; and assigning a starting position value and an ending position value to each of said text strings of each said text line of the plain text data.

20. A computer readable storage device as recited in claim 15 wherein said probability weights comprise:

name probability weights each indicating a probability that said corresponding text string represents a company name;

company name probability weights each indicating a probability that said corresponding text string represents a company name;

address probability weights each indicating a probability that said corresponding text string represents an address;

city name probability weights each indicating a probability that said corresponding text string represents a city name;

zip code probability weights each indicating a probability that said corresponding text string represents a zip code;

title probability weights each indicating a probability that said corresponding text string represents a title; and telephone number probability weights each indicating a probability that said corresponding text string represents a telephone number.

* * * * *